(12) United States Patent
Canel-Katz et al.

(10) Patent No.: US 8,571,257 B2
(45) Date of Patent: Oct. 29, 2013

(54) METHOD AND SYSTEM FOR IMAGE REGISTRATION

(71) Applicant: Koplar Interactive Systems International, LLC, St. Louis, MO (US)

(72) Inventors: Lilly Canel-Katz, Clayton, MO (US); Jonathan I. Katz, Clayton, MO (US)

(73) Assignee: Koplar Interactive Systems International L.L.C., St. Louis, MO (US)

( * ) Notice: Subject to any disclaimer, the term of this patent is extended or adjusted under 35 U.S.C. 154(b) by 0 days.

(21) Appl. No.: 13/646,955

(22) Filed: Oct. 8, 2012

(65) Prior Publication Data

US 2013/0028526 A1    Jan. 31, 2013

Related U.S. Application Data

(63) Continuation of application No. 11/970,464, filed on Jan. 7, 2008, now Pat. No. 8,284,984.

(60) Provisional application No. 60/883,619, filed on Jan. 5, 2007, provisional application No. 60/910,409, filed on Apr. 5, 2007.

(51) Int. Cl.
*G06K 9/00* (2006.01)
*G06K 9/36* (2006.01)
*G06K 9/46* (2006.01)
*H04L 9/32* (2006.01)

(52) U.S. Cl.
USPC ............ 382/100; 382/232; 382/233; 713/176

(58) Field of Classification Search
USPC ......... 382/100, 232, 233, 162, 240, 250, 251, 382/236, 282; 713/176; 380/210, 252, 287; 348/461, 463
See application file for complete search history.

(56) References Cited

U.S. PATENT DOCUMENTS

| | | | | |
|---|---|---|---|---|
| 6,700,990 | B1 * | 3/2004 | Rhoads | 382/100 |
| 7,646,883 | B2 * | 1/2010 | Kogure et al. | 382/100 |
| 7,653,232 | B2 * | 1/2010 | Kothapalli et al. | 382/132 |
| 7,974,438 | B2 * | 7/2011 | Canel-Katz et al. | 382/100 |
| 2006/0088200 | A1 * | 4/2006 | Du et al. | 382/144 |
| 2006/0291707 | A1 * | 12/2006 | Kothapalli et al. | 382/128 |
| 2007/0195988 | A1 * | 8/2007 | Kogure et al. | 382/100 |

OTHER PUBLICATIONS

C. Lin, M.Wu, J. Bloom, I. Cox, M. Miller, and Y. Lui, "Rotation, scale, and translation resilient watermarking for images," IEEE Trans. Image Processing, vol. 10, pp. 767-782, May 2001.*

Dong Zheng; Jiying Zhao; Saddik, A.E., "RST-invariant digital image watermarking based on log-polar mapping and phase correlation," Circuits and Systems for Video Technology, IEEE Transactions on, vol. 13, No. 8, pp. 753,765, Aug. 2003.*

* cited by examiner

*Primary Examiner* — Andrae S Allison
(74) *Attorney, Agent, or Firm* — Christopher R. Carroll; The Small Patent Law Group LLC

(57) ABSTRACT

Methods and systems for image registration are described. An area of an image may be selected. A length of at least one encoded wavelength for the area may be accessed. One or more candidate wavelengths may be identified in the area in at least one direction that includes at least one large peak. The length of the at least one encoded wavelength may be compared to the length of at least one of the one or more candidate wavelengths to calculate an alteration ratio. The alteration ratio may identify at least one of a scale or a rotation of the image.

15 Claims, 20 Drawing Sheets

METHOD AND SYSTEM FOR IMAGE REGISTRATION

CROSS-REFERENCE TO RELATED APPLICATIONS

This application is a continuation of U.S. Pat. No. 8,284,984, which was filed on 7 Jan. 2008, and is entitled "Method And System For Image Registration" (the "'984 Patent"). The '984 Patent claims the benefit of U.S. Provisional Patent Applications entitled "Spatial Data Imprinting, " Ser. No. 60/883,619, filed 5 Jan. 2007, and "Method And System For Image Registration, " Ser. No. 60/910,409, filed 5 Apr. 2007 (the "'619 Application" and the "'409 Application, " respectively). The entire disclosures of the '984 Patent, the '619 Application, and the '409 Application are incorporated by reference.

FIELD

This application relates to a method and system for data processing, and more specifically to methods and systems for spatial data encoding and decoding.

BRIEF DESCRIPTION OF DRAWINGS

Embodiments are illustrated by way of example and not limitation in the figures of the accompanying drawings, in which like references indicate similar elements and in which.

DETAILED DESCRIPTION

Example methods and systems for image registration are described. In the following description, for purposes of explanation, numerous specific details are set forth in order to provide a thorough understanding of example embodiments. It will be evident, however, to one skilled in the art that the present invention may be practiced without these specific details.

In an example embodiment, a region of an image may be accessed. The region may include a plurality of pixels. One or more wavelengths may be selected. One or more associated phases for the one or more wavelengths may be selected. A function may be calculated using the one or more wavelengths and the one or more associated phases of the one or more wavelengths and used to construct a digital image registration pattern. The digital image registration pattern may include a plurality of pattern values. At least one pixel variable value of the plurality of pixels may be altered by a pattern value obtained from the digital image registration pattern.

In an example embodiment, an encoding region of an image may be accessed. A comparison region of a comparison image may be accessed. An average pixel variable value of one or more subregions of the encoding region and the average pixel variable value of one or more subregions of the comparison region may be taken to obtain a comparison region average and an encoding region average for the one or more subregions. The pixel variable values of a plurality of pixels in a particular subregion of the encoding region may be adjusted so that their new average after adjustment is equal to the corresponding average in the comparison region to create a prepared subregion. An encoding pattern may be accessed. The encoding region of the image may be altered in accordance with the encoding pattern to encode the image. The encoding region may include the prepared subregion.

In an example embodiment, an area of an image may be selected. A length of at least one encoded wavelength for the area may be accessed. One or more candidate wavelengths and associated directions may be identified in the area corresponding to one or more large peaks (e.g. in the DFT of the pixel variable values for that area in those directions). The length of the at least one encoded wavelength may be compared to the length of at least one of the one or more candidate wavelengths to calculate an alteration ratio. The alteration ratio may be used (including in conjunction with candidate wavelengths in other directions) to identify at least one of a scale or a rotation of the image.

Figure 1:
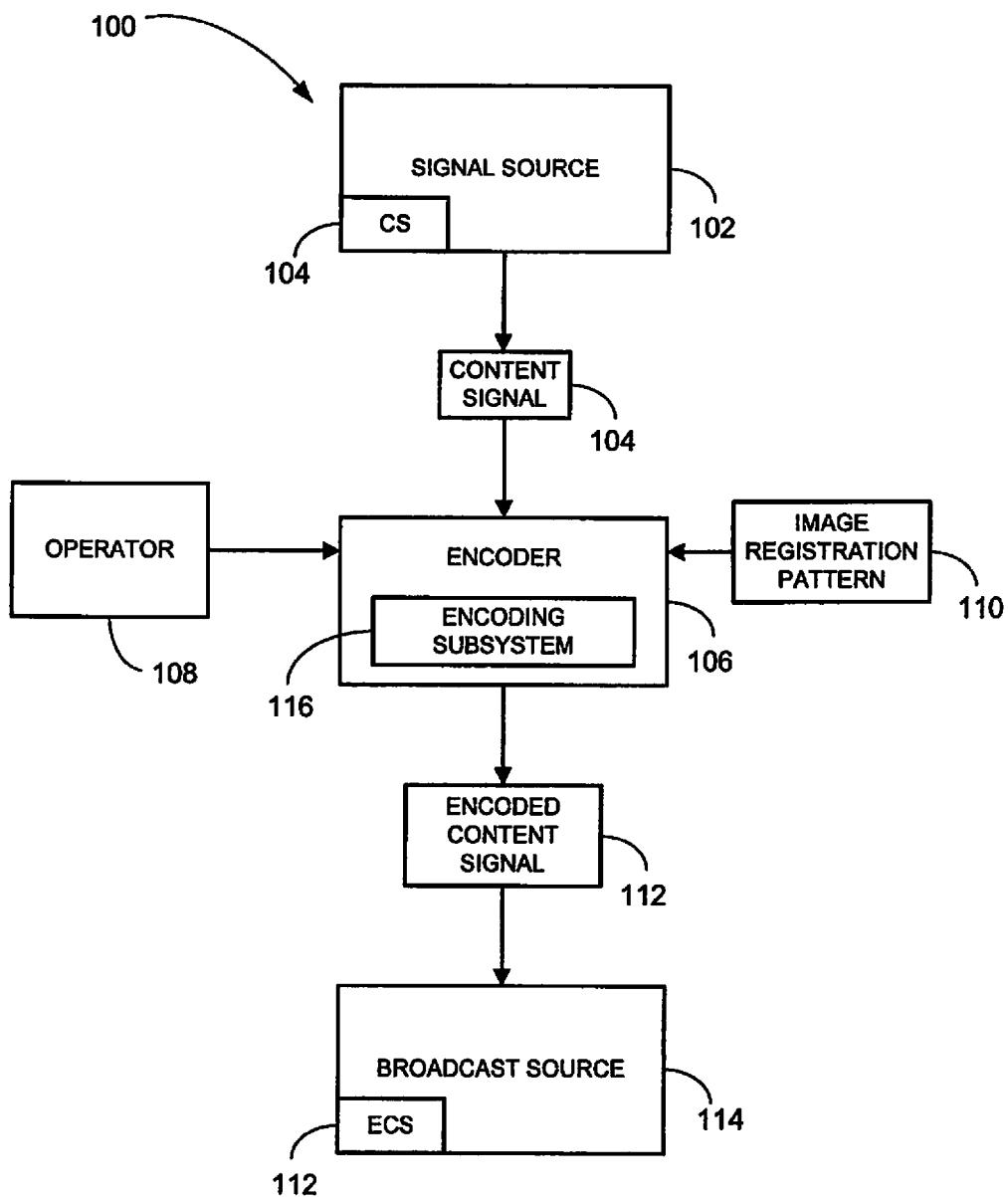
FIG. 1 is a block diagram of an example encoding system according to an example embodiment.

FIG. 1 illustrates an example encoding system 100 according to an example embodiment. The encoding system 100 is an example platform in which one or more embodiments of an encoding method of the present invention may be used. However, other platforms may also be used.

A content signal 104 may be provided from a signal source 102 to an encoder 106 in the encoding system 100. The content signal 104 is one or more images and optionally associated audio. Examples of the content signal 104 include standard definition (SD) and/or high definition (HD) content signals in NTSC (National Television Standards Committee), PAL (Phase Alternation Line), SECAM (Systeme Electronique Couleur Avec Memoire), a MPEG (Moving Picture Experts Group) signal, one or more JPEGs (Joint Photographic Experts Group) sequence of bitmaps, or other signal formats that transport of a sequence of images. The form of the content signal 104 may be modified to enable implementations involving the content signals 104 of various formats and resolutions.

The signal source 102 is a unit that is capable of providing and/or reproducing one or more images electrically in the form of the content signal 104. Examples of the signal source 102 include a professional grade video tape player with a video tape, a camcorder, a stills camera, a video file server, a computer with an output port, a digital versatile disc (DVD) player with a DVD disc, and the like.

An operator 108 may interact with the encoder 106 to control its operation to encode an image registration pattern 110 within the content signal 104, thereby producing an encoded content signal 112 that may be provided to a broadcast source 114. The operator 108 may be a person that interacts with the encoder 106 (e.g., through the use of a computer or other electronic control device). The operator 108 may consist entirely of hardware, firmware and/or software, or other electronic control device that directs operation of the encoder 106 in an automated manner.

The encoded content signal 112 may be provided to the broadcast source 114 for distribution and/or transmission to an end-user (e.g., a viewer) who may view the content associated with encoded content signal 112. The broadcast source 114 may deliver the encoded content signal 112 to one or more viewers in formats including analog and/or digital video by storage medium such as DVD, tapes, and other fixed medium and/or by transmission sources such as television broadcast stations, cable, satellite, wireless and Internet sources that broadcast or otherwise transmit content. The encoded content signal 112 may be further encoded (e.g., MPEG encoding) at the broadcast source 114 prior to delivering the encoded content signal 112 to the one or more viewers. Additional encoding may occur at the encoder 106, the broadcast source 114, or anywhere else in the production chain.

The image registration pattern 110 may be encoded within the encoded content signal 112. The image registration pattern 110 may be used to determine alignment of the image. For example, the image registration pattern 110 may be used to decode further information (e.g., one or more messages) from the encoded content signal 112.

Encoding of the image registration pattern 110 may be performed by an encoding subsystem 116 of the encoder 106. An example embodiment of the encoding subsystem 116 is described in greater detail below.

Figure 2:
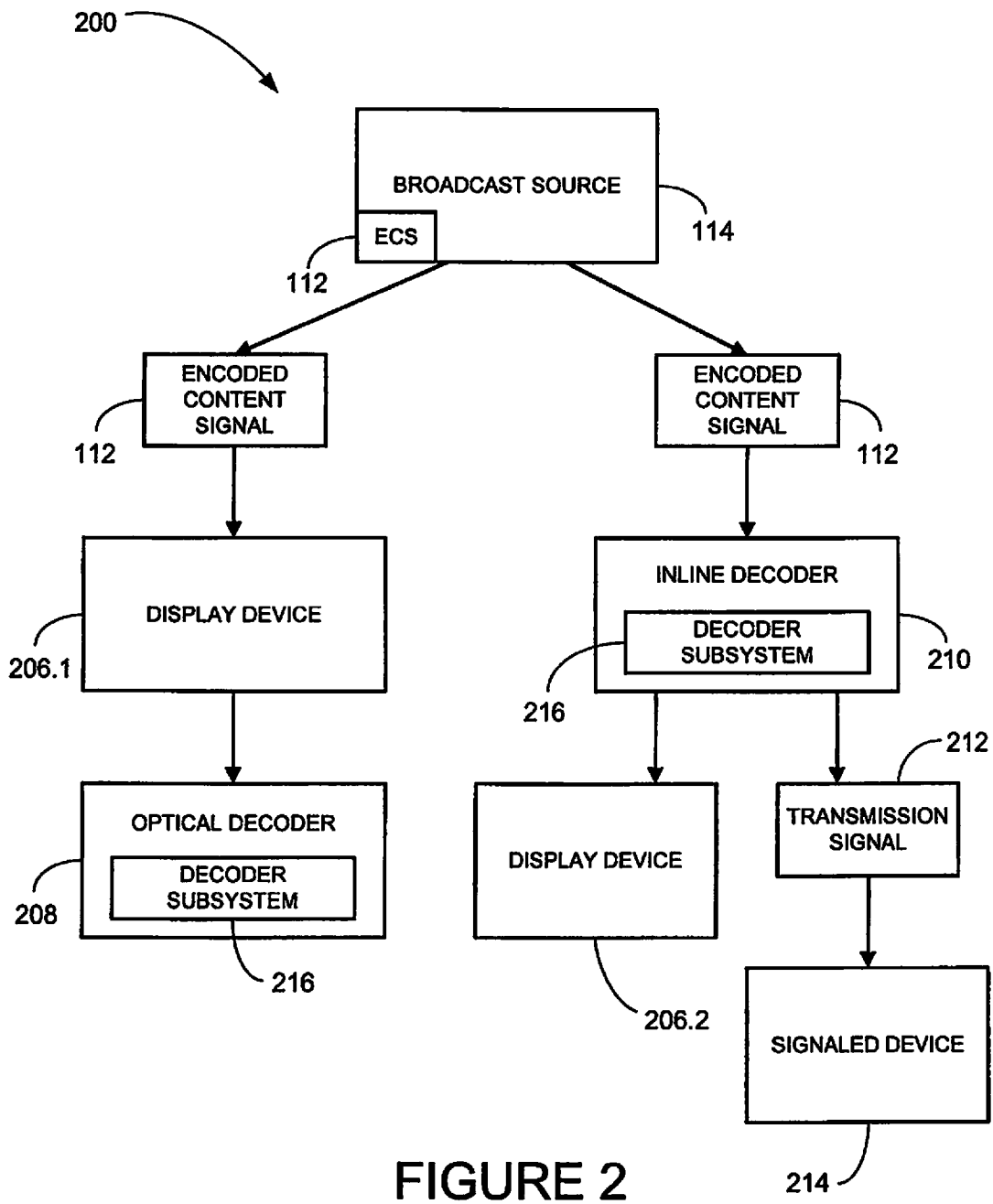
FIG. 2 is a block diagram of an example decoding system according to an example embodiment.

FIG. 2 illustrates an example decoding system 200 according to an example embodiment. The decoding system 200 is an example platform in which one or more embodiments of a decoding method of the present invention may be used. However, other platforms may also be used.

The decoding system 200 may send the encoded content signal 112 from the broadcast source 114 (see FIG. 1) to a display device 206.1 and/or an inline decoder 210. The inline decoder 210 may receive (e.g., electrically) the encoded content signal 112 from the broadcast source 114, and thereafter may transmit a transmission signal 212 to a signaled device 214 and optionally provide the encoded content signal 112 to a display device 206.2.

The inline decoder 210 may decode the image registration pattern 110 encoded within the encoded content signal 112 and transmit data regarding the image registration pattern 110 to the signaled device 214 by use of the transmission signal 212 and provide the encoded content signal 112 to a display device 206.2. The transmission signal 212 may include a wireless radio frequency, infrared or other signal format. The transmission signal 212 may be sent wirelessly (rf or optically) or on a direct wire connection. Other transmission mediums by which signals may be sent and received can be used.

The signaled device 214 may be a device capable of receiving and processing the image registration pattern 110 transmitted by the transmission signal 212. The signaled device 214 may be a DVD recorder, PC based or consumer electronic-based personal video recorder, and/or other devices capable of recording content to be viewed or any device capable of storing, redistributing and/or subsequently outputting or otherwise making the encoded content signal 112 available. For example, the signaled device 214 may be a hand-held device such as a portable gaming device, a toy, a mobile telephone, and/or a personal digital assistant (PDA). The signaled device 214 may be integrated with the inline decoder 210.

An optical decoder 208 may receive and process the image registration pattern 110 from a display device 206.1. For example, the image registration pattern may be processed to determine the alignment of the encoded content signal 112. An implementation of the optical decoder 208 is described in greater detail below.

The display device 206.1 may receive the encoded content signal 112 directly from the broadcast source 114 while the display device 206.2 may receive the encoded content signal 112 indirectly through the inline decoder 210. The display devices 206.1., 206.2 may be devices capable of presenting the content signal 104 and/or the encoded content signal 112 to a viewer such as an analog or digital television, but may additionally or alternatively include a device capable of recording the content signal 104 and/or the encoded content signal 112 such as a digital video recorder. Examples of the display devices 206.1., 206.2 may include, but are not limited to, projection televisions, plasma televisions, liquid crystal displays (LCD), personal computer (PC) screens, digital light processing (DLP), stadium displays, and devices that may incorporate displays such as toys and personal electronics.

A decoder subsystem 216 may be deployed in the optical decoder 208 and/or the inline decoder 210 to decode the image registration pattern 110 in the encoded content signal 112. An example embodiment of the decoder subsystem 216 is described in greater detail below.

Figure 3:
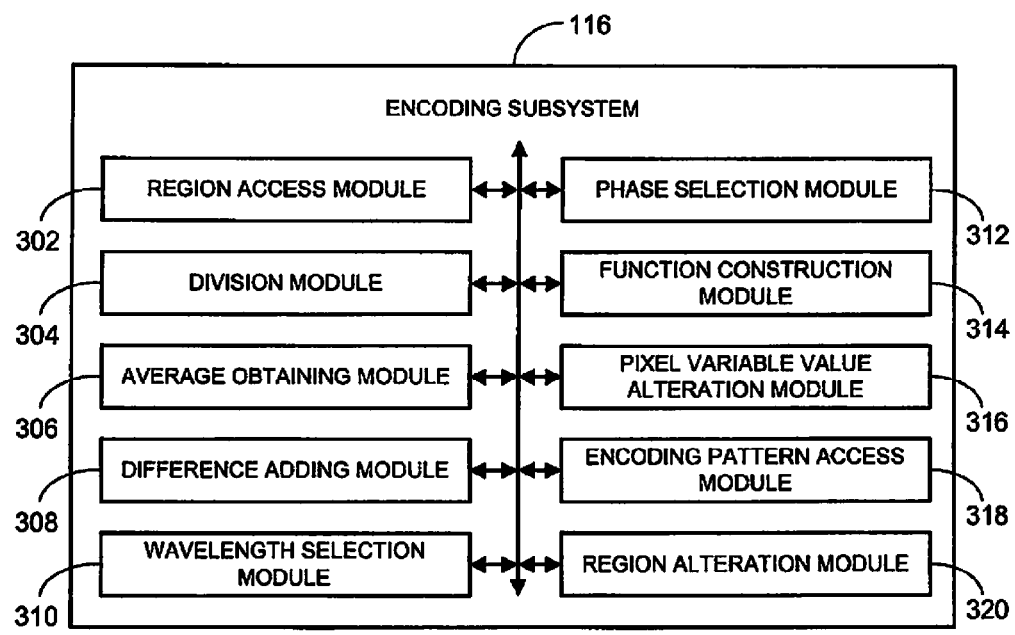
FIG. 3 is a block diagram of an example encoding subsystem that may be deployed in the encoding system of FIG. 1 according to an example embodiment.

FIG. 3 illustrates an example encoding subsystem 116 that may be deployed in the encoder 106 of the encoding system 100 (see FIG. 1) or otherwise deployed in another system.

The encoding subsystem 300 may include a region access module 302, a division module 304, an average obtaining module 306, a difference adding module 308, a wavelength selection module 310, a phase selection module 312, a function construction module 314, a pixel variable value alteration module 316, an encoding pattern access module 318, and/or region alteration module 320. Other modules may also be used.

The region access module 302 accesses a region, an encoding region of an image and/or a comparison region of a comparison image. The region, the encoding region, and/or the comparison region may include a number of pixels. The division module 304 divides the encoding region and the comparison region into one or more subregions.

The average obtaining module 306 takes an average pixel variable value (e.g., average chrominance or average luminance) of one or more subregions of the encoding region and/or the comparison region to obtain a comparison region average and/or an encoding region average for the one or more subregions. While the average obtaining module as described herein deals with statistical averages as one example, it will be understood that the module 306 can perform other statistical calculations, e.g., mean, median, etc. These other calculations can be used to supplement or replace the average values in other examples.

The difference adding module 308 adds the difference between the comparison subregion average for a pixel variable and the encoding subregion average value to the pixel values for a plurality of subregion pixels of a particular subregion of the one or more subregions to create a prepared region.

The wavelength selection module 310 selects one or more wavelengths. A number of wavelengths may be selected by the wavelength selection module in a defined ratio. The wavelengths may be greater than two pixels and/or smaller than the width and/or or the height of the region.

The phase selection module 312 selects one or more associated phases for the one or more wavelengths. The function construction module 314 calculates a function using the one or more wavelengths and/or the one or more associated phases of the one or more wavelengths to construct a digital image registration pattern. The digital image registration pattern may include a number of pattern values. The function may include combining (e.g. a linear combination) one or more trigonometric cosine functions and/or one or more trigonometric sine functions on the one or more wavelengths and the one or more associated phases of the one or more wavelengths. However, other types of functions may also be used.

The pixel variable value alteration module 316 alters one or more pixel variable values of the pixels by a pattern value obtained from the digital image registration pattern. A pixel variable value may be the value for a single pixel of any value used in specifying the color, hue, brightness or intensity for a pixel, such as, by way of example, one of R, G, B, Y, Cb, Cr or a function of one or more of those values. The pixel variable values may be altered in at least one direction by the obtained pattern value. The directions may include a horizontal direction, a vertical direction, and/or a diagonal direction. However, other directions may also be used. When multiple directions are used, the directions may be linearly independent from one another.

The encoding pattern access module 318 accesses an encoding pattern. The region alteration module 320 alters the encoding region of the image in accordance with the encoding pattern to encode the image. The encoding region may include a prepared subregion.

Figure 4:
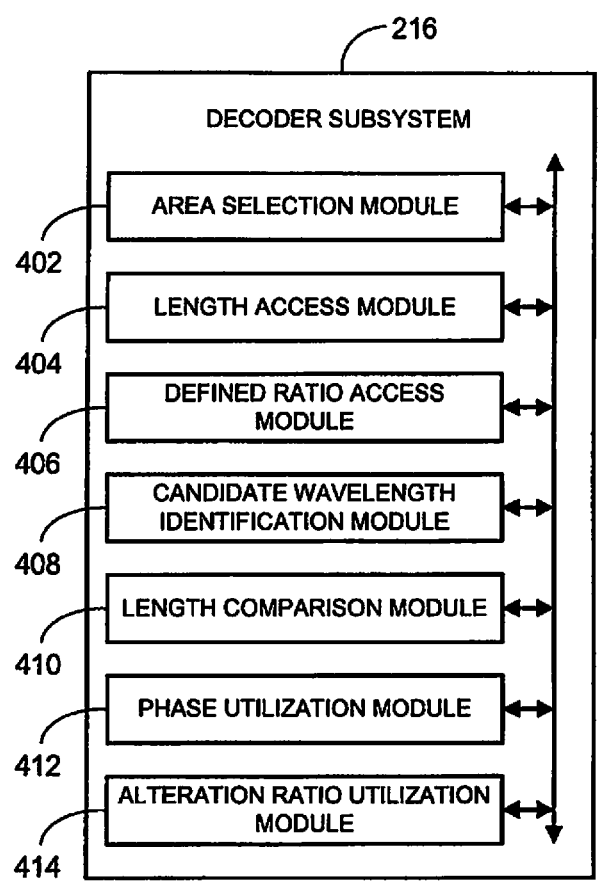
FIG. 4 is a block diagram of an example decoder subsystem that may be deployed in the decoding system of FIG. 2 according to an example embodiment.

FIG. 4 illustrates an example decoder subsystem 216 that may be deployed in the optical decoder 208 and/or the inline decoder 210 of the decoding system 200 (see FIG. 2) or otherwise deployed in another system.

The decoding subsystem 400 may include an area selection module 402, a length access module 404, a defined ratio access module 406, a candidate wavelength identification module 408, a length comparison module 410, a phase utilization module 412, and/or an alteration ratio utilization module 414. Other modules may also be used.

The area selection module 402 selects an area of an image. The length access module 404 accesses a length of one or more encoded wavelengths for the area selected by the area selection module 402.

The defined ratio access module 406 accesses a defined ratio for the encoded wavelengths. The candidate wavelength identification module 408 identifies one or more candidate wavelengths in the area in one or more directions. The candidate wavelengths may, for example, have been identified as one or more large peaks in a Fourier transform of pixel variable values in the area. The candidate wavelengths may be in a defined ratio in the area.

The length comparison module 410 compares the length of the one or more encoded wavelengths to the length of the one or more candidate wavelengths to calculate an alteration ratio. The alteration ratio may identify a scale or a rotation of the image.

The phase utilization module 412 uses the phase. The phase may be used to calculate a shift value and/or decode the encoded content signal 112. The shift value may be capable of being used to determine a shift or offset of the image.

The alteration ratio utilization module 414 utilizes the alteration ratio. The alternation ration may be utilized to configure detection of a message encoded in the encoded content signal 112, to identify a rotation of the image, to identify an image alignment of the image, or the like.

Figure 5:
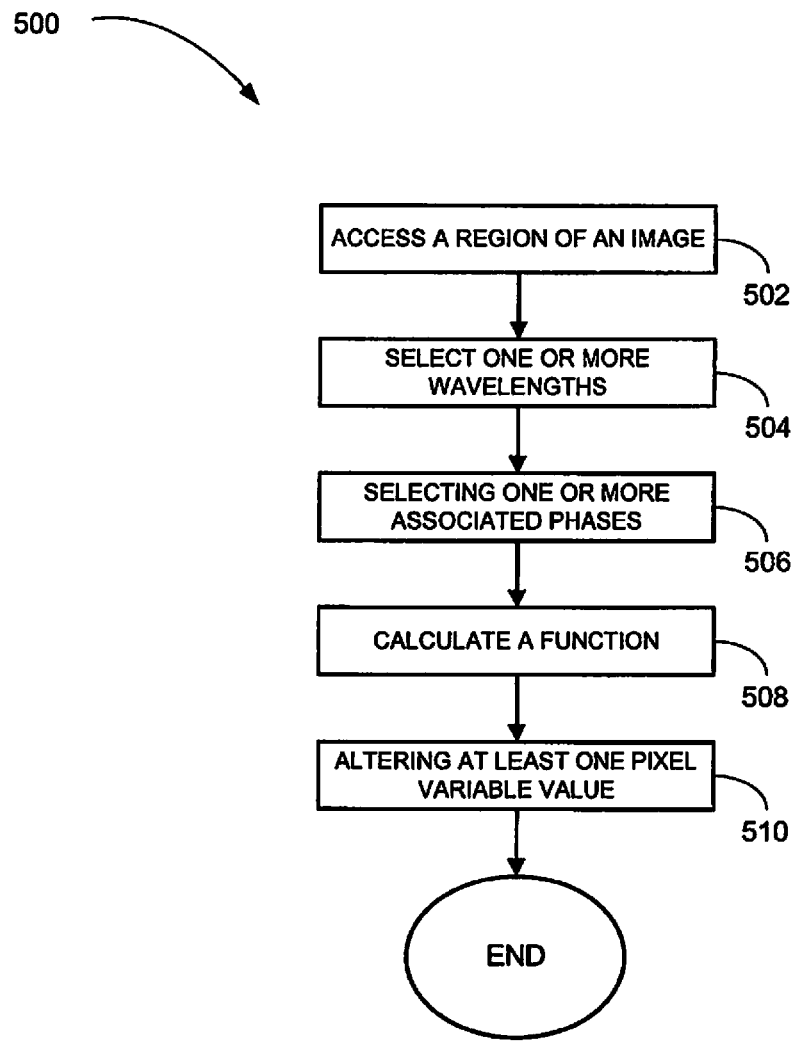
FIG. 5 is a flowchart illustrating a method for image registration pattern encoding in accordance with an example embodiment.

FIG. 5 illustrates a method 500 for image registration pattern encoding according to an example embodiment. The method 500 may be performed by the encoder 106 (see FIG. 1) or otherwise performed.

A region of an image may be accessed for encoding of the image registration pattern 110 at block 502. The region may include a number of pixels. The image may be a partial or entire frame of the content signal 104, a digital image, or otherwise be selected for encoding.

One or more wavelengths may be selected for construction of a digital image registration pattern at block 504. The one or more wavelengths may be greater than two pixels and smaller than the width and/or the height of the region.

Multiple wavelengths may be selected in a defined ratio. The defined ratio may be, by way of an example, 2:3:5, though other ratios may also be used. Different ratios may be selected for two different directions of encoding and/or for different encoding channels (e.g., red chrominance, blue chrominance and luminance.)

One or more associated phases may be selected for the one or more wavelengths at block 506. Different phases may be chosen for sine and cosine functions and/or for different channels and/or different directions.

A function may be calculated for the one or more wavelengths and the one or more associated phases of the one or more wavelengths to construct a digital image registration pattern at block 508. The digital image registration pattern may include a number of pattern values. The digital image registration pattern may be one-dimensional, two-dimensional or otherwise selected.

The function may include, by way of an example, a linear combination of trigonometric cosine functions, a linear combination of trigonometric sine functions, or a linear combination of sine and cosine functions. Other trigonometric and non-trigonometric functions may also be used. The amplitude of the functions may be selected so that their effect on the image is not noticeable to the human eye.

One or more pixel variable values of the pixels may be altered by an image registration pattern value obtained from the digital image registration pattern at block 510 to encode the image registration pattern 110 in the image.

The alteration to the one or more pixel variable values may be in one or more directions including a horizontal direction, a vertical direction, and/or or a diagonal direction. However, other directions may also be used. When multiple directions are selected, the multiple directions may be linearly independent and may include, by way of example, a linear combination of a horizontal direction and a vertical direction.

One or more pixel variable values may be altered in a multiple columns of pixels in the region by corresponding pattern values of the image registration pattern values and/or one or more pixel variable values may be altered in multiple rows of pixels in the region by the corresponding pattern values of the image registration pattern values.

The image registration pattern may be two-dimensional and the amount by which a pixel variable value is raised or lowered may depend on both the row and the column identifying the pixel.

Multiple pixels in the region may have their pixel variable values in a selected channel (e.g., chrominance and/or luminance) raised or lowered by the value given by a one-dimensional digital image registration pattern 110. For example, if the direction is chosen to be horizontal, then pixel variable values for pixels in column one may be altered by the amount given by the first value in the digital image registration pattern 110, pixels in column two may have their pixel variable values altered by the amount given by the second value in the digital image registration pattern 110, and so on for subsequent columns. If the direction is chosen to be vertical, then pixels in row one may be altered by the amount given by the first value in the digital image registration pattern 110, the plurality of pixels in column two may be altered by the amount given by the second value in the digital image registration pattern 110, and so on. When two directions are selected, the pixel variable values may optionally be changed by the sum of the effects due to the two directions.

Figure 6:
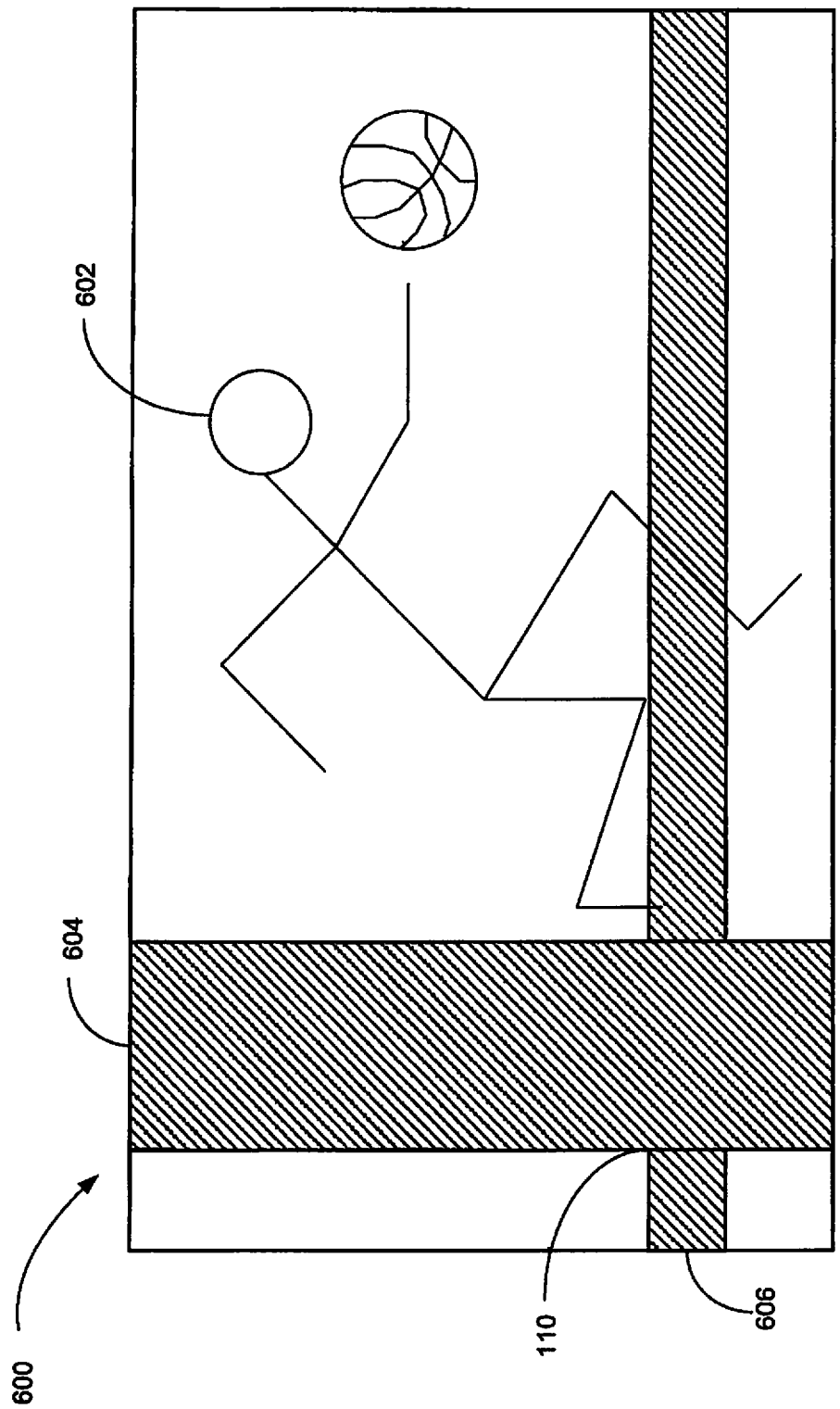
FIGS. 6 and 7 are diagrams of example images according to an example embodiment.

FIG. 6 illustrates an example image 600 according to an example embodiment. The image 600 may be a frame of the content signal 104, an individual image, or the like. An image portion 602 of the image 600 is altered in accordance with the image registration pattern 110 (see FIG. 1) is shown to include a horizontal bar 604 and a vertical bar 606 within the image portion 602. However, different types of bars or other shapes may be used for the image registration pattern 110. The image registration pattern 110 may be substantially invisible or visible within the image portion 602.

Figure 7:
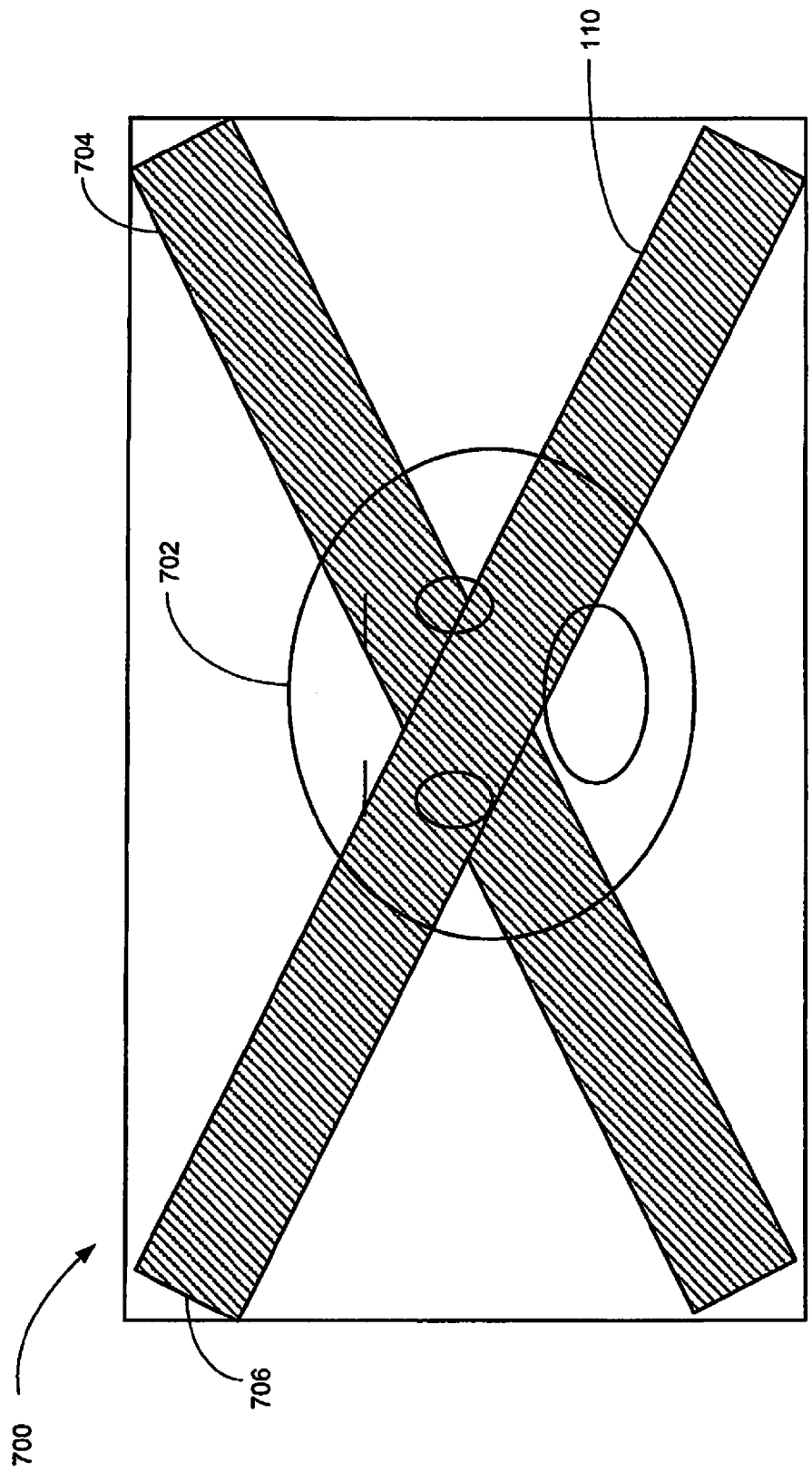

FIG. 7 illustrates an example image 700 according to an example embodiment. An image portion 702 of the image 700 is altered in accordance with the image registration pattern 110 (see FIG. 1) is shown to include two diagonal bars 704, 706 within the image portion 602. However, different types of bars or other shapes may be used for the image registration pattern 110. The image registration pattern 110 may be substantially invisible or visible within the image portion 602.

Figure 8:
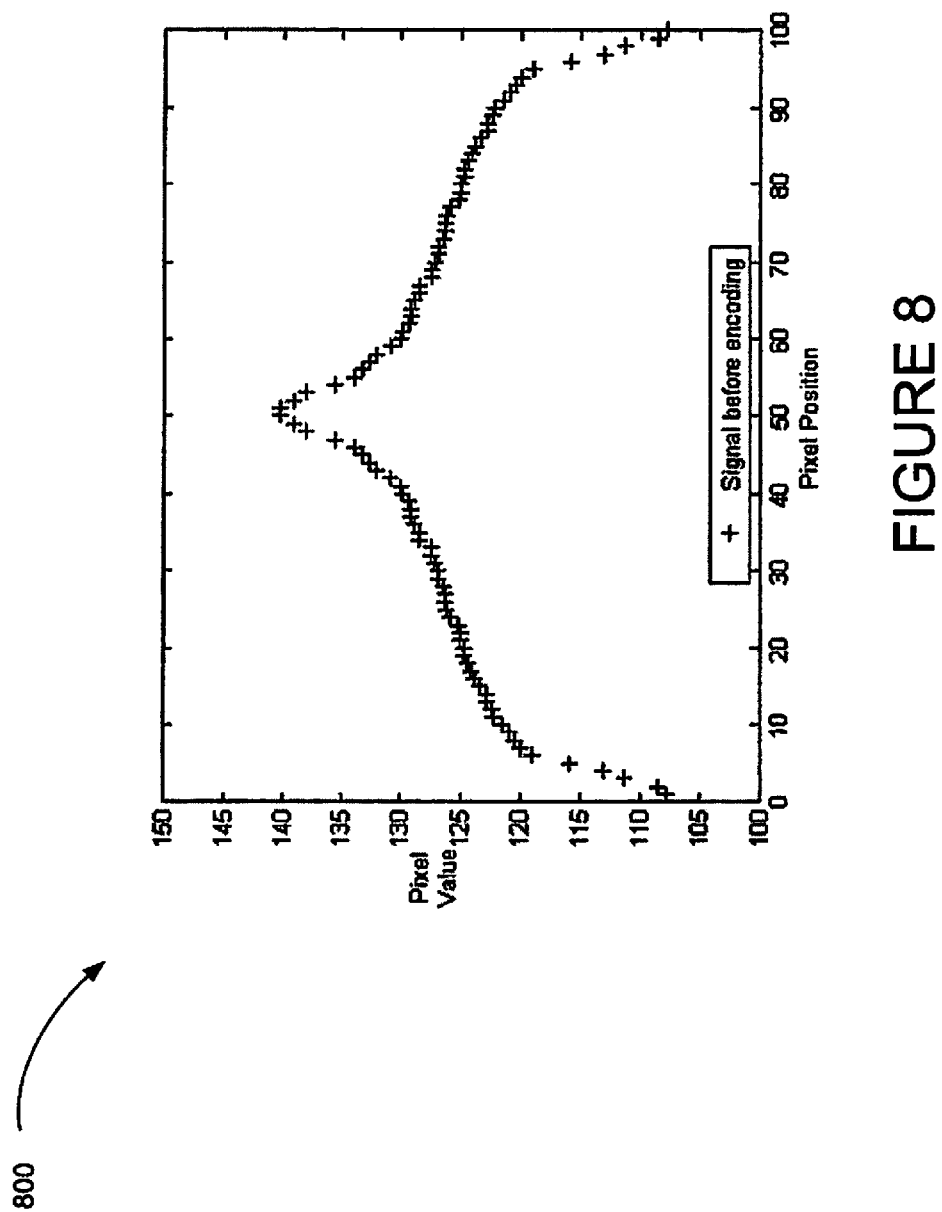
FIGS. 8-10 are diagrams of example charts according to an example embodiment.
Figure 9:
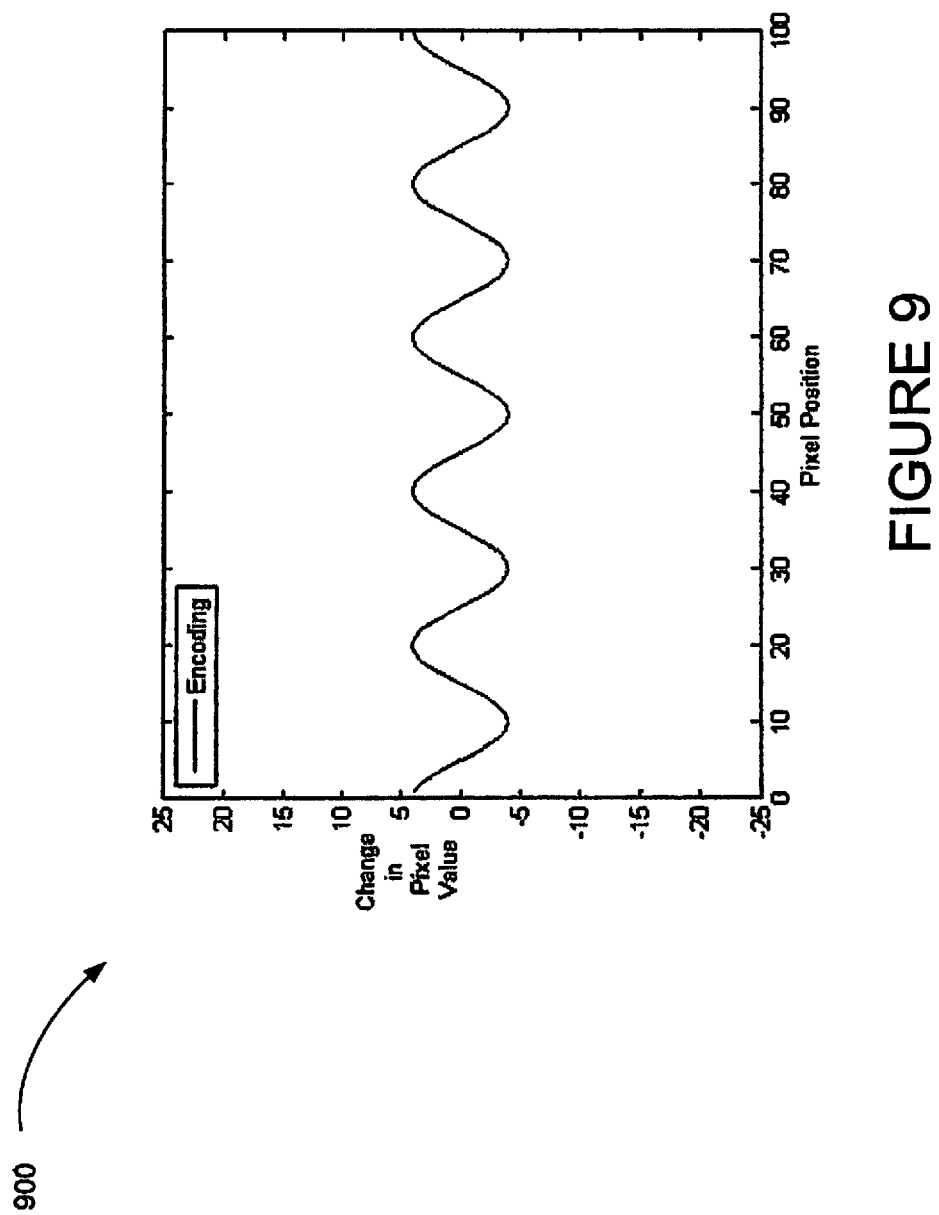
Figure 10:
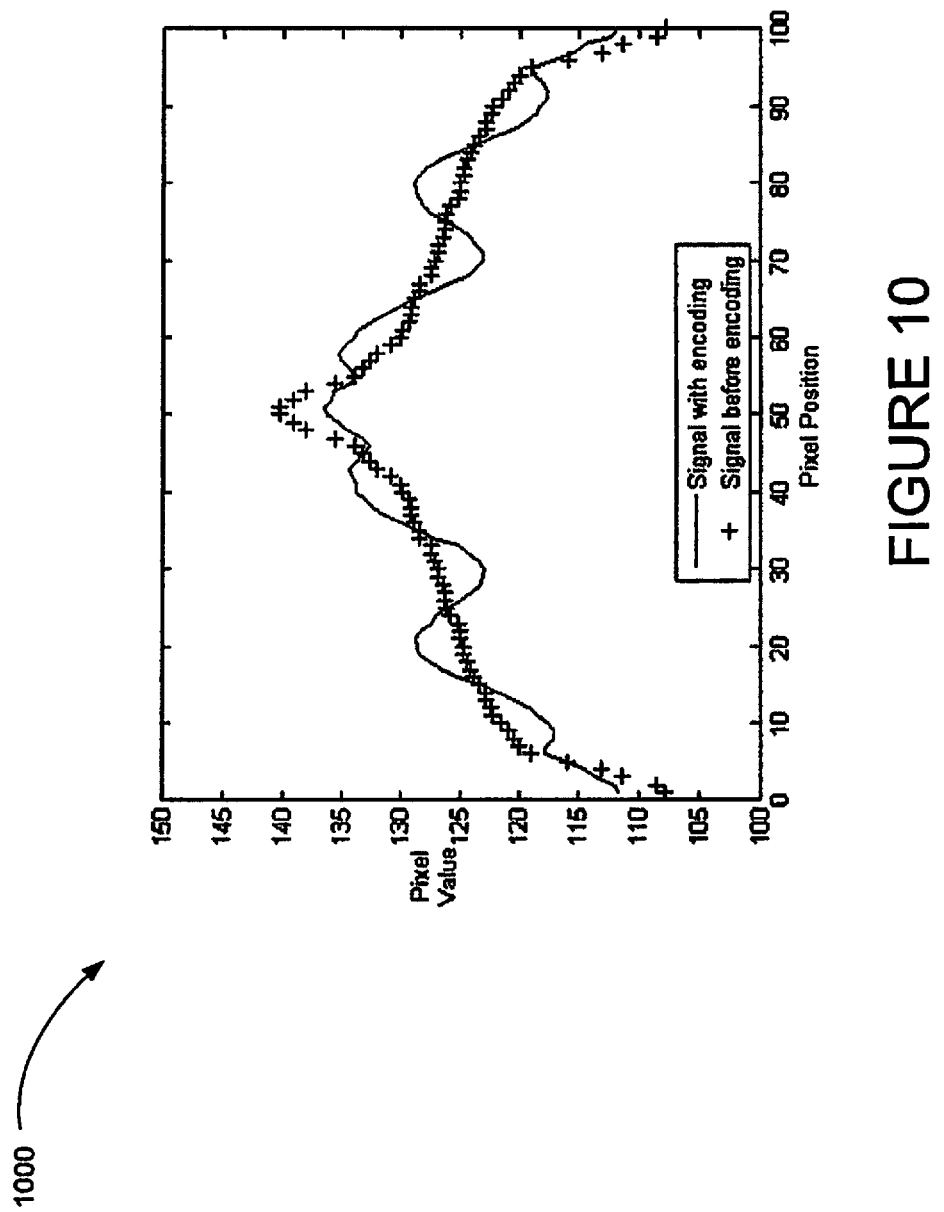

FIGS. 8-10 illustrate example charts 800, 900, 1000 according to an example embodiment. The chart 800 may illustrate an example plotting of pixel variable values for a specific row or column of an image prior to encoding. The chart 900 may illustrate example values of change of an image to be encoded. The chart 1000 may illustrate the pixel variable values in the specific row or column of the image of chart 800 before and after encoding.

Figure 11:
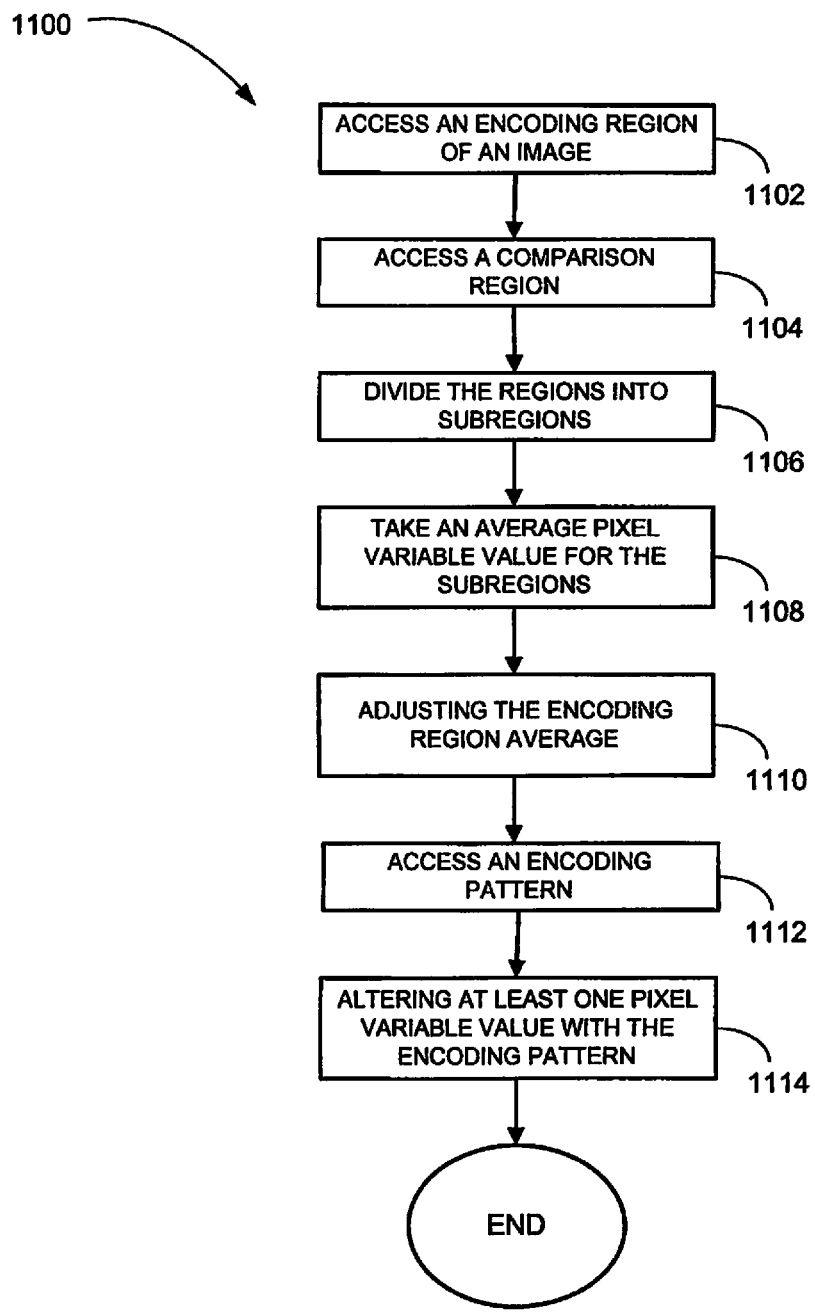
FIG. 11 is a flowchart illustrating a method for encoding in accordance with an example embodiment.

FIG. 11 illustrates a method 1100 for encoding according to an example embodiment. The method 1100 may be performed by the encoder 106 (see FIG. 1) or otherwise performed.

An encoding region of an image is accessed at block 1102. A comparison region of a comparison image is accessed at block 1104.

The encoding region and the comparison region may be divided into one or more subregions at block 1106. The subregions may have the same or different dimensions as the encoding region and the comparison region.

An average pixel variable value of one or more subregions of the encoding region and the comparison region are taken at block 1108 to obtain a comparison region average and an encoding region average for the one or more subregions.

At block 1110, the pixel variable values of a plurality of pixels in a subregion of the encoding region may be adjusted so that their new average pixel variable value after adjustment is in accordance (e.g., equal or similar) to the corresponding average in the comparison region to create a prepared subregion.

An encoding pattern is accessed at block 1112. The encoding pattern may be of a particular shape and/or be in a different region.

The encoding region (including the prepared subregion) of the image is altered in accordance with the encoding pattern to encode the image at block 1114.

Figure 12:
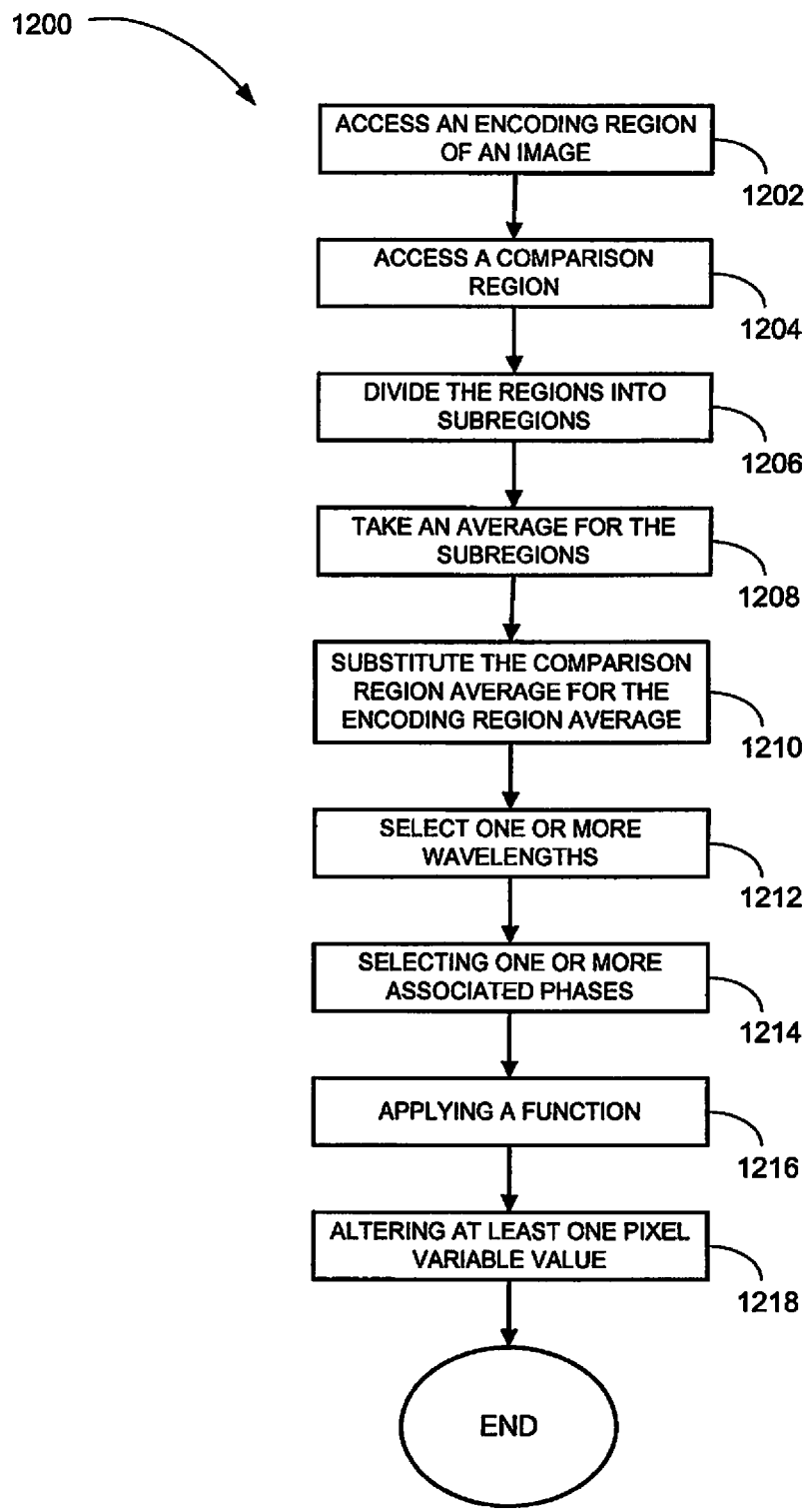
FIG. 12 is a flowchart illustrating a method for image registration pattern encoding in accordance with an example embodiment.

FIG. 12 illustrates a method 1200 for image registration pattern encoding according to an example embodiment. The method 1200 may be performed by the encoder 106 (see FIG. 1) or otherwise performed.

An encoding region of the image is accessed at block 1202. A comparison region of a comparison image is accessed at block 1204.

At block 1208, an average pixel variable value of one or more subregions of the encoding region and the comparison region is taken to obtain a comparison region average and an encoding region average for the one or more subregions.

At block 1210, the pixel variable values of a plurality of pixels in a subregion of the encoding region may be adjusted so that their new average pixel variable value after adjustment is in accordance (e.g., equal or similar) to the corresponding average in the comparison region to create a prepared subregion.

One or more wavelengths are selected at block 1212. One or more associated phases for the one or more wavelengths are selected at block 1214.

A function is calculated using the one or more wavelengths and the one or more associated phases of the one or more wavelengths to construct a digital image registration pattern at block 1216. The digital image registration pattern may include a number of pattern values.

One or more pixel variable values of the pixels are altered by a pattern value obtained from the digital image registration pattern at block 1218.

Figure 13:
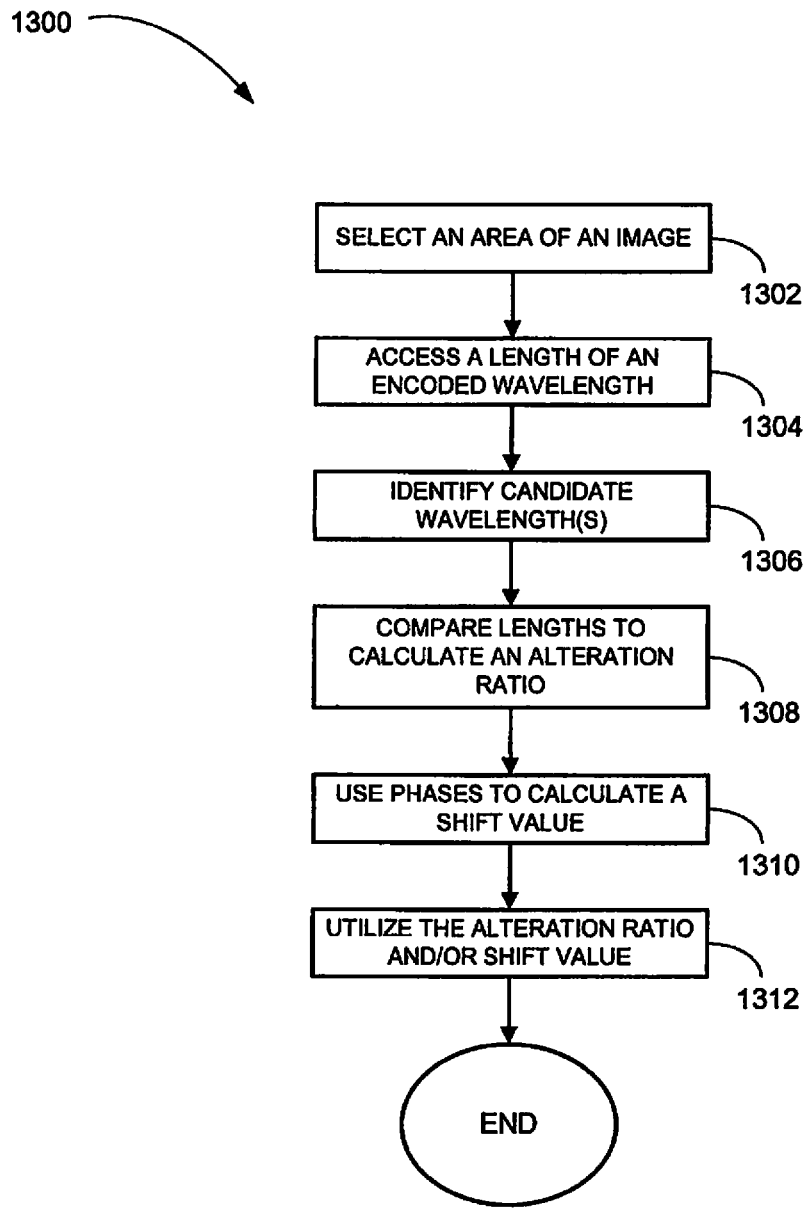
FIGS. 13 and 14 are flowcharts illustrating a method for image registration pattern detection in accordance with an example embodiment.

FIG. 13 illustrates a method 1300 for image registration pattern detection according to an example embodiment. The method 1300 may be performed by the optical decoder 208, the inline decoder 210 (see FIG. 2) or otherwise performed.

An area of an image may be selected at block 1302. The area may be a selection of an image where the image registration pattern 110 is believed to be located and may include, by way of an example, the full image, its left half, its right half, rectangular subregions or other selections made within an image. The image may be a frame of the encoded content signal 112 or otherwise accessed.

A length of one or more encoded wavelengths for the area may be accessed at block 1304. The length of all encoded wavelengths may not need to be known to detect the image registration pattern 110.

One or more candidate wavelengths in the area in one or more directions may be identified at block 1306. An example embodiment of identifying candidate wavelengths is described in greater detail below.

In an example embodiment, one-dimensional or two-dimensional discrete Fourier transforms (DFTs) may be calculated for pixel variable values in the chosen area in all channels for which encoding may have taken place. Absolute values of the DFTs in each channel may be calculated and the resulting largest values (e.g., the peaks) may be used to identify candidate wavelengths for that channel. For a given direction and channel if several candidate wavelengths are in the same ratio as the encoded wavelengths, then the minimum of these candidate wavelengths may be estimated to correspond to the minimum of the encoded wavelengths. The alteration ratio may then be estimated from the ratio of the decoding estimate and the encoded value.

The length of the one or more encoded wavelengths may be compared to the length of one or more candidate wavelengths to calculate an alteration ratio at block 1308.

The alteration ratio may identify a scale or a rotation of the image. The alteration ratio may include a ratio of a minimum wavelength in the area to a minimum encoded wavelength in at least one direction. However, other wavelengths (e.g., a maximum encoded wavelength) may also be used.

A comparison of the alteration ratios may be used when detecting in two directions to provide a ratio of any compression or stretching in that direction. When only one direction has been encoded in a particular channel, the DFT may be also be calculated in two directions to, for example, detect rotation of the image.

A comparison wavelength may be selected from one or more candidate wavelengths and the length of one or more encoded wavelengths may be compared to the length of the comparison wavelength to calculate an alteration ratio. For example, a comparison wavelength may be selected with the greatest length from the one or more candidate wavelengths or by having a peak that most closely resembles the peak of an encoded wavelength from the one or more encoded wavelengths.

One or more phases may be used to calculate a shift value at block 1310. The alteration ratio and/or the shift value may be utilized at block 1312. For example, the alteration ratio and/or the shift value may be used to configure detection of a message encoded in the encoded content signal 112, identify a rotation of the image, and/or identify an image alignment of the image. The shift value may be used to determine a shift of the image. The alteration ratio and/or the shift value may also be used for other purposes.

The rotation of the image may be determined from the effects of image compression of the wavelengths and introduction of signal encoded in one direction in the same ratio in the other direction (e.g., signal leakage). The calculations may provide to two compression ratios, one from the main signal and one from the "leaked" signal for each direction encoded. The "leaked" signal may or may not be large enough to be detected in the DFT of the other direction depending on the strength of encoding and the amount of rotation, but may be searched for. Thus, if in an example embodiment encoding has been applied in both the horizontal and vertical directions, each direction may contain "leaked" signal from the other direction. Applying the mathematics of rotation of axes may show that the angle of rotation is given by the inverse cosine of the compression factor in the appropriate direction. In the other direction the "leaked" signal may be of magnitude proportional to the inverse sine of the angle of rotation, which may be used to calculate the amount of rotation. The analysis may be complete if there is no overall scaling in addition to rotation. If both are present, redundancy in the calculated values may allow separation of the effects. In addition, encoding in different directions may further help in separating the effects from encoding.

In an example embodiment, decoding may determine whether the image alignment has been changed (e.g. whether some pixels have been added to the top or left of the image). In general, if pixels have been added or removed from the side of an image it may be equivalent to an offset shift (e.g., a phase shift) in the encoded content signal 112. This may give rise to changes in both the real and the imaginary parts of the DFT of the encoded content signal 112 which may be used to determine the offset shift. In an example embodiment the encoding may be done in such a way that the encoding causes no changes in the imaginary part of the DFT of the image. This may be done, for example, by using cosine waves with no phase shift on encoding. In this case, examination of the imaginary values of the DFT for the wavelengths encoded may give the amount of shift in that direction. There may be an ambiguity in the result, as the method may not distinguish between a value of shift and the same shift incremented or decremented by an integer number of wavelengths. A comparison of the shift for calculated for several wavelengths may be used to remove some of the ambiguity.

Figure 14:
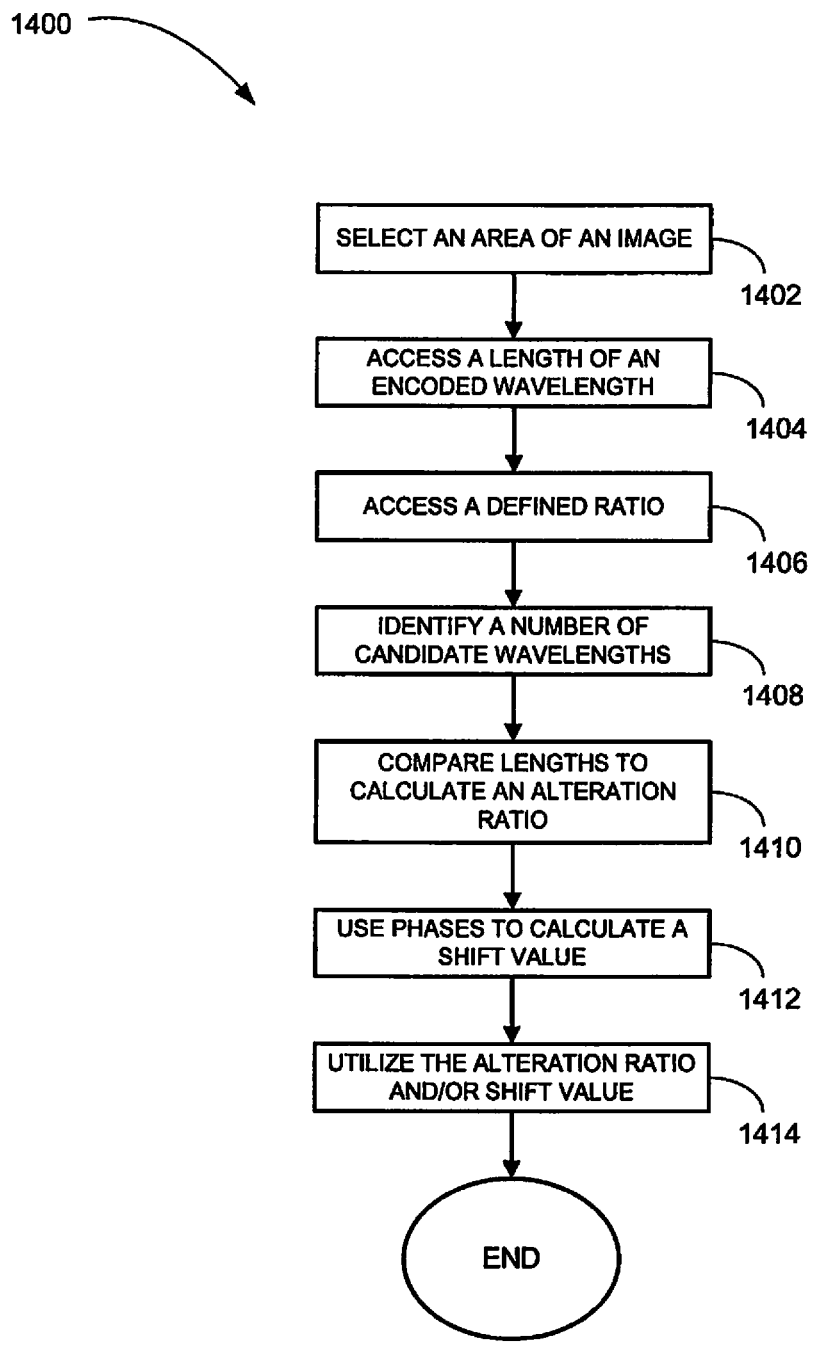

FIG. 14 illustrates a method 1400 for image registration pattern detection according to an example embodiment. The method 1400 may be performed by the optical decoder 208, the inline decoder 210 (see FIG. 2) or otherwise performed.

An area of an image is selected at block 1402. A length of a number of encoded wavelengths for the area is accessed at block 1404. A defined ratio for multiple encoded wavelengths is accessed at block 1406.

At block 1408, multiple candidate wavelengths in the defined ratio are identified in the area in one or more directions that include the at least one large peak.

At block 1410, the length of the one or more encoded wavelengths may be compared to the length of one or more candidate wavelengths to calculate an alteration ratio. The alteration ratio may identify a scale or a rotation.

A phase may be used to calculate a shift value at block 1412. The alteration ratio and/or shift value may be utilized at block 1414.

Figure 15:
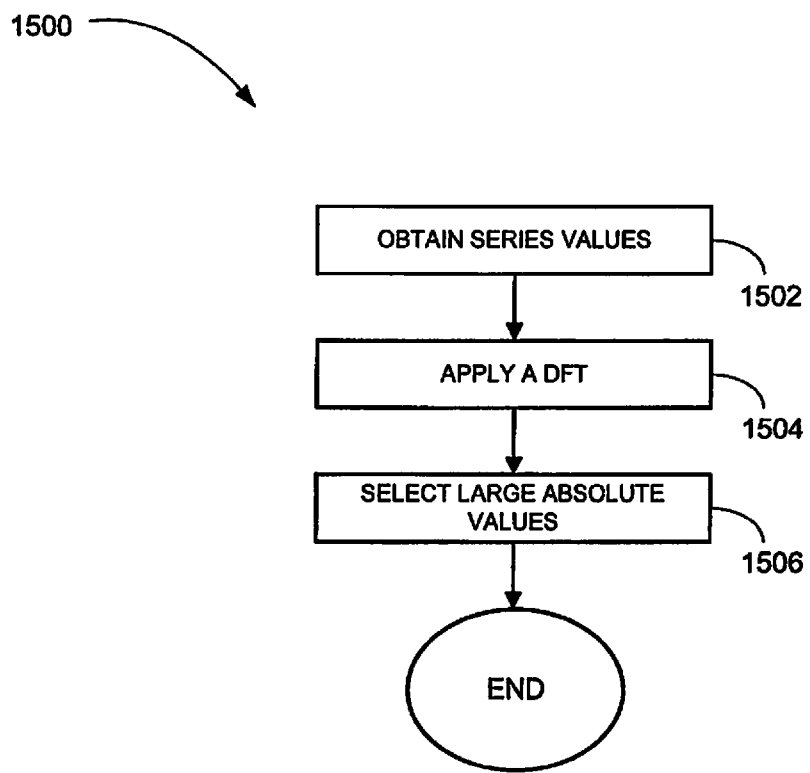
FIGS. 15 and 16 are flowcharts illustrating a method for candidate wavelength identification in accordance with an example embodiment.

FIG. 15 illustrates a method 1500 for candidate wavelength identification according to an example embodiment. The method 1500 may be performed at block 1306, block 1406, or otherwise performed.

A number of series values may be calculated by adding pixel variable values from a number of rows and/or a number of columns of a region at block. The series values may be calculated by adding pixel variable values in a series that is perpendicular to the diagonal direction of a region. Other directions in the region may also be selected for calculating the series values. In an example embodiment, the values averaged over might be perpendicular to the direction in which the function to be encoded varies most quickly.

A Discrete Fourier Transform may be applied to the series values at block 804. The DFT may be used to decode periodic signals of known wavelengths and/or ratios of wavelengths previously encoded.

The large absolute values (e.g., largest absolute values) among the applied series values may be selected to identify candidate wavelengths for at least one direction (e.g., a horizontal direction, a vertical direction, and/or a perpendicular direction) at block 806. The analysis of the large absolute values in the DFTs may provide a determination of the wavelengths of the periodic signals encoded. The large absolute values may suggest that the corresponding wavelengths have been encoded in a particular direction.

Figure 16:
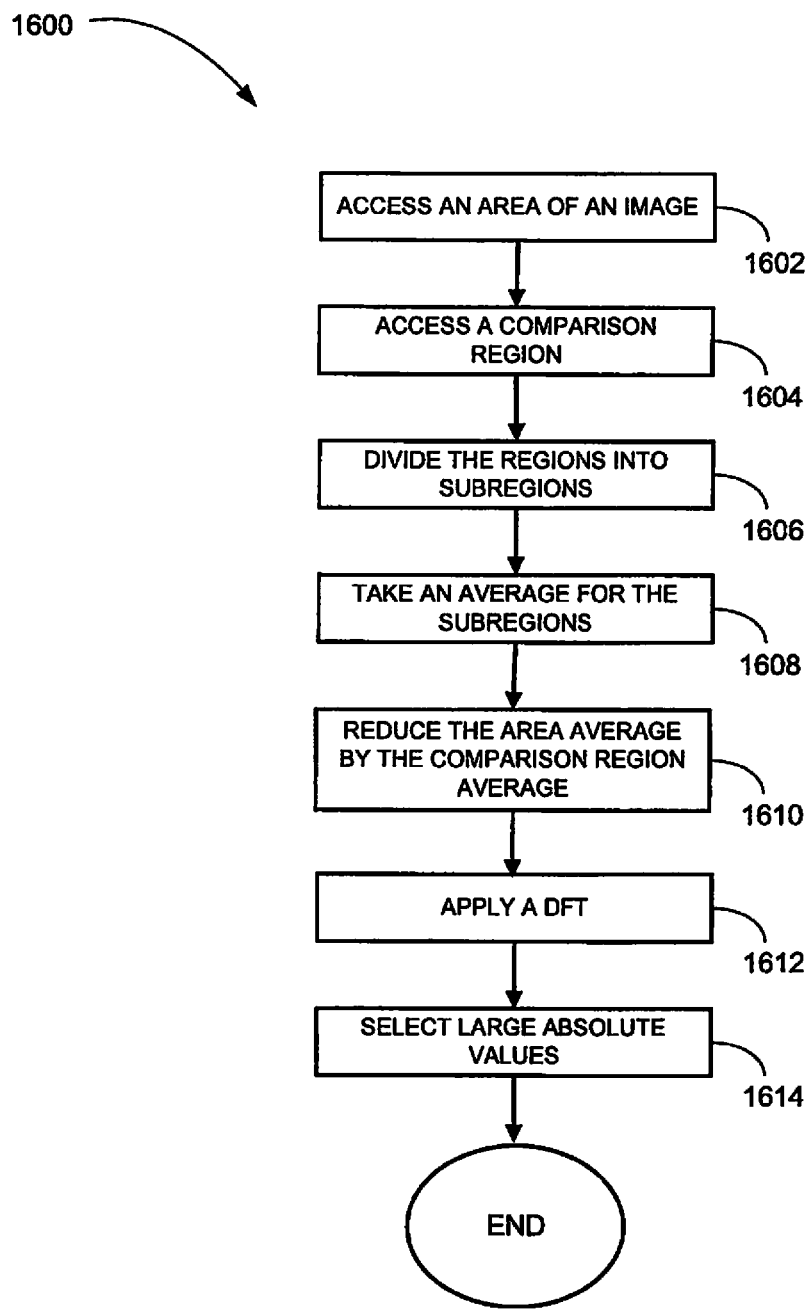

FIG. 16 illustrates a method 1600 for candidate wavelength identification according to an example embodiment. The method 1600 may be performed at block 1306, block 1406, or otherwise performed.

An area of the image is accessed at block 1602. A comparison region of a comparison image is accessed at block 1604. The comparison image may be the same image as accessed during the operations at block 1602 or from a different image (e.g., in the encoded content signal 112).

The area and the comparison region may be divided into one or more subregions at block 1606. An average pixel variable value of the one or more subregions of the area and the comparison region are taken at block 1608 to obtain a comparison region average and an area average for the one or more subregions.

The area average is reduced by the comparison region average to obtain a number of area values at block 1610. A DFT is applied to the area values at block 1612.

One or more large absolute values are selected among the applied area values to identify the one or more candidate wavelengths at block 1614.

Figure 17:
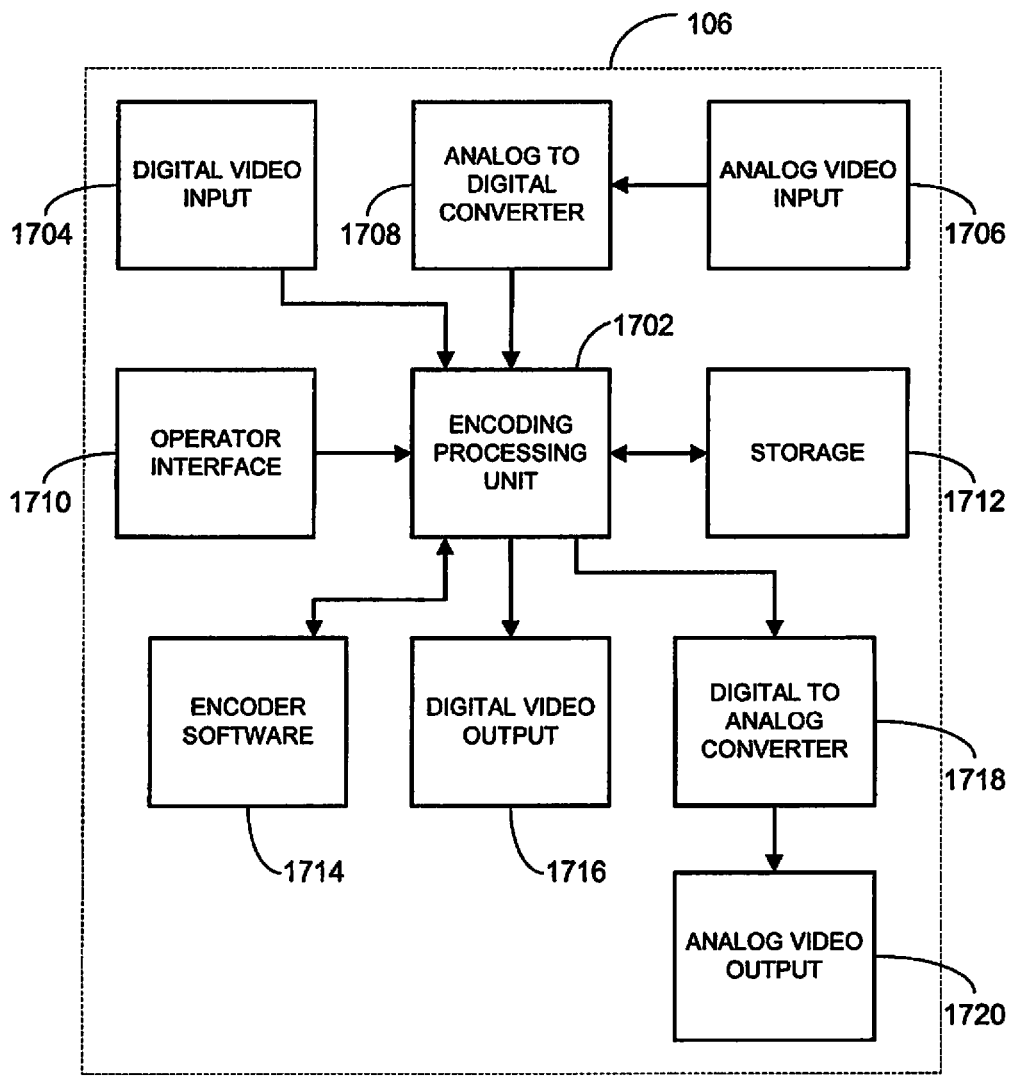
FIG. 17 is a block diagram of an example encoder that may be deployed in the encoding system of FIG. 1 according to an example embodiment.

FIG. 17 illustrates an example encoder 106 (see FIG. 1) that may be deployed in the encoding system 100 or another system.

The encoder 106 may be a computer with specialized input/output hardware, an application specific circuit, programmable hardware, an integrated circuit, an application software unit, a central process unit (CPU) and/or other hardware and/or software combinations.

The encoder 106 may include an encoder processing unit 1702 that may direct operation of the encoder 106. For example, the encoder processing unit 1702 may alter attributes of the content signal 104 to produce the encoded content signal 112 containing the image registration pattern 110.

A digital video input 1704 may be in operative association with the encoder processing unit 1702 and may be capable of receiving the content signal 104 from the signal source 102. However, the encoder 106 may additionally or alternatively receive an analog content signal 104 through an analog video input 1706 and an analog-to-digital converter 1708. For example, the analog-to-digital converter 1708 may digitize the analog content signal 104 such that a digitized content signal 104 may be provided to the encoder processing unit 1702.

An operator interface 1710 may be operatively associated with encoder processing unit 1702 and may provide the encoder processing unit 1702 with instructions including where, when and/or at what magnitude the encoder 106 should selectively raise and/or lower a pixel value (e.g., the luminance and/or chrominance level of one or more pixels or groupings thereof at the direction of the operator 108). The instructions may be obtained by the operator interface 1710 through a port and/or an integrated operator interface. However, other device interconnects of the encoder 106 may be used including a serial port, universal serial bus (USB), "Firewire" protocol (IEEE 1394), and/or various wireless protocols. In an example embodiment, responsibilities of the operator 108 and/or the operator interface 1710 may be partially or wholly integrated with the encoder software 1714 such that the encoder 106 may operate in an automated manner.

When encoder processing unit 1702 receives operator instructions and the content signal 104, the encoder processing unit 1702 may store the luminance values and/or chrominance values as desired of the content signal 104 in storage 1712. The storage 1712 may have the capacity to hold and retain signals (e.g., fields and/or frames of the content signal 104 and corresponding audio signals) in a digital form for access (e.g., by the encoder processing unit 1702). The storage 1712 may be primary storage and/or secondary storage, and may include memory.

After modulating the content signal 104 with the image registration pattern 110, the encoder 106 may send the resulting encoded content signal 112 in a digital format through a digital video output 1716 or in an analog format by converting the resulting digital signal with a digital-to-analog converter 1718 and outputting the encoded content signal 112 by an analog video output 1720.

The encoder 106 need not include both the digital video input 1704 and the digital video output 1716 in combination with the analog video input 1706 and the analog video output 1720. Rather, a lesser number of the inputs 1704, 1706 and/or the outputs 1716, 1720 may be included. In addition, other forms of inputting and/or outputting the content signal 104 (and the encoded content signal 112) may be interchangeably used.

In an example embodiment, components used by the encoder 106 may differ when the functionality of the encoder 106 is included in a pre-existing device as opposed to a stand alone custom device. The encoder 106 may include varying degrees of hardware and/or software, as various components may interchangeably be used.

Figure 18:
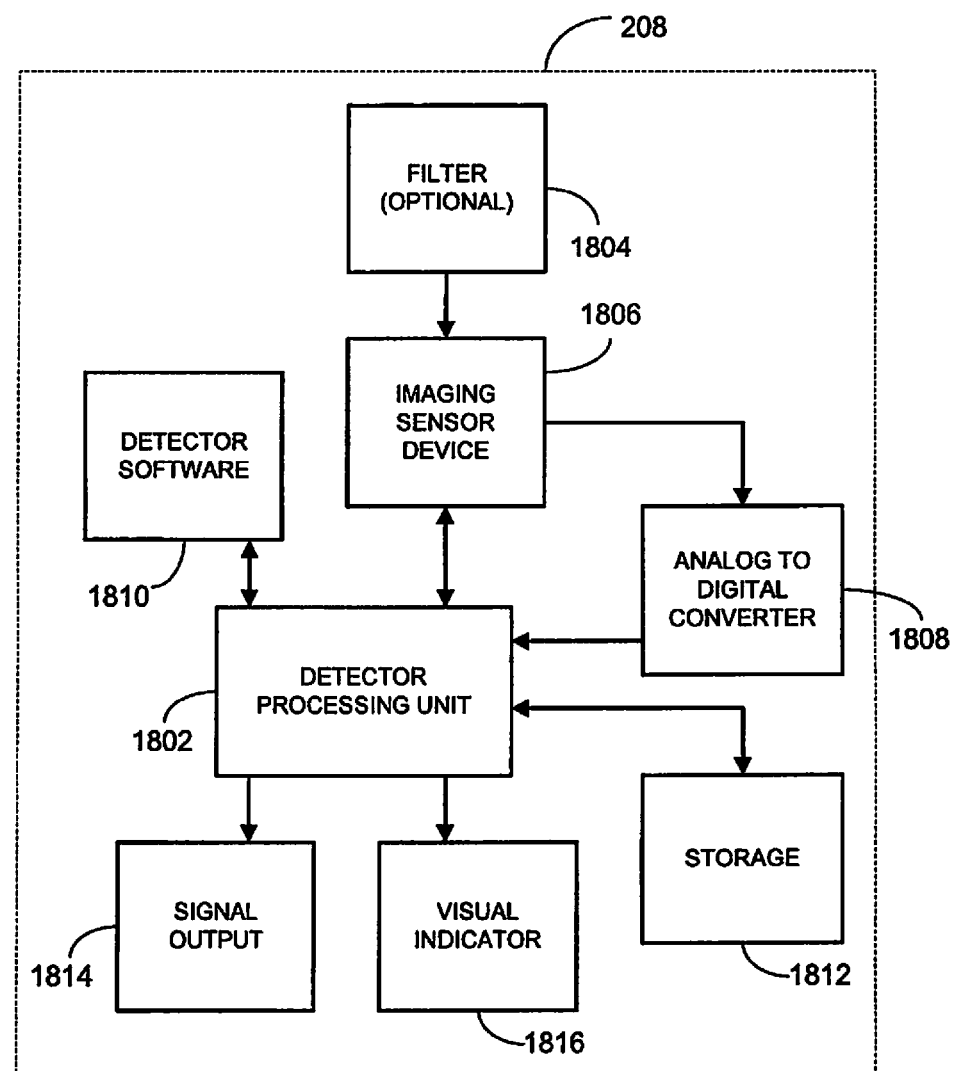
FIG. 18 is a block diagram of an example optical decoder that may be deployed in the decoding system of FIG. 2 according to an example embodiment.

FIG. 18 illustrates an example optical decoder 208 (see FIG. 2) that may be deployed in the decoding system 200 or another system.

The optical decoder 208 may include an imaging sensor device 1806 operatively associated with an analog-to-digital converter 1808 and a decoder processing unit 1802 to optically detect the encoded content signal 112 (e.g., as may be presented on the display device 206.1., 206.2 of FIG. 2).

In an example embodiment, the imaging sensor device 1806 may be a CMOS (Complimentary Metal Oxide Semiconductor) imaging sensor, while in another example embodiment the imaging sensor device may be a CCD (Charge-Coupled Device) imaging sensor. The imaging sensor device 1806 may be in focus to detect motion on the display device 206.1, 206.2 relative to background.

The decoder processing unit 1802 may be an application specific circuit, programmable hardware, integrated circuit, application software unit, and/or hardware and/or software combination. The decoder processing unit 1802 may store the values (e.g., luminance, chrominance, or luminance and chrominance) of the encoded content signal 112 in storage 1812 and may detect pixels that have increased and/or decreased pixel values. The decoder processing unit 1802 may process the encoded content signal 112 to detect the image registration pattern 110.

A filter 1804 may be placed over a lens of the imaging sensor device 1806 to enhance the readability of the image registration pattern 110 contained within the encoded content signal 112. For example, an optical filter (e.g., a red filter or a green filter) may be placed over a lens of the imaging sensor device 1806. A digital filter and other types of filters may also be used.

A signal output 1814 may be electrically coupled to the decoder processing unit 1802 and provide a data output for the image registration pattern 110 and/or data associated with the image registration pattern 110 after further processing by the optical decoder 208. For example, the data output may be one-bit data and/or multi-bit data.

An optional visual indicator 1816 may be further electrically coupled to the decoder processing unit 1802 and may provide a visual and/or audio feedback to a user of the optical decoder 208, which may by way of example include notice of availability of promotional opportunities based on the receipt of the message.

The decoder processing unit 1802 may store the pixel variable values of the encoded content signal 112 in the storage 1812 and detect the alteration to the pixel variable values of the encoded content signal 112. In an example embodiment, the functionality of the storage 1812 may include the functionality of the storage 1712 (see FIG. 17).

Figure 19:
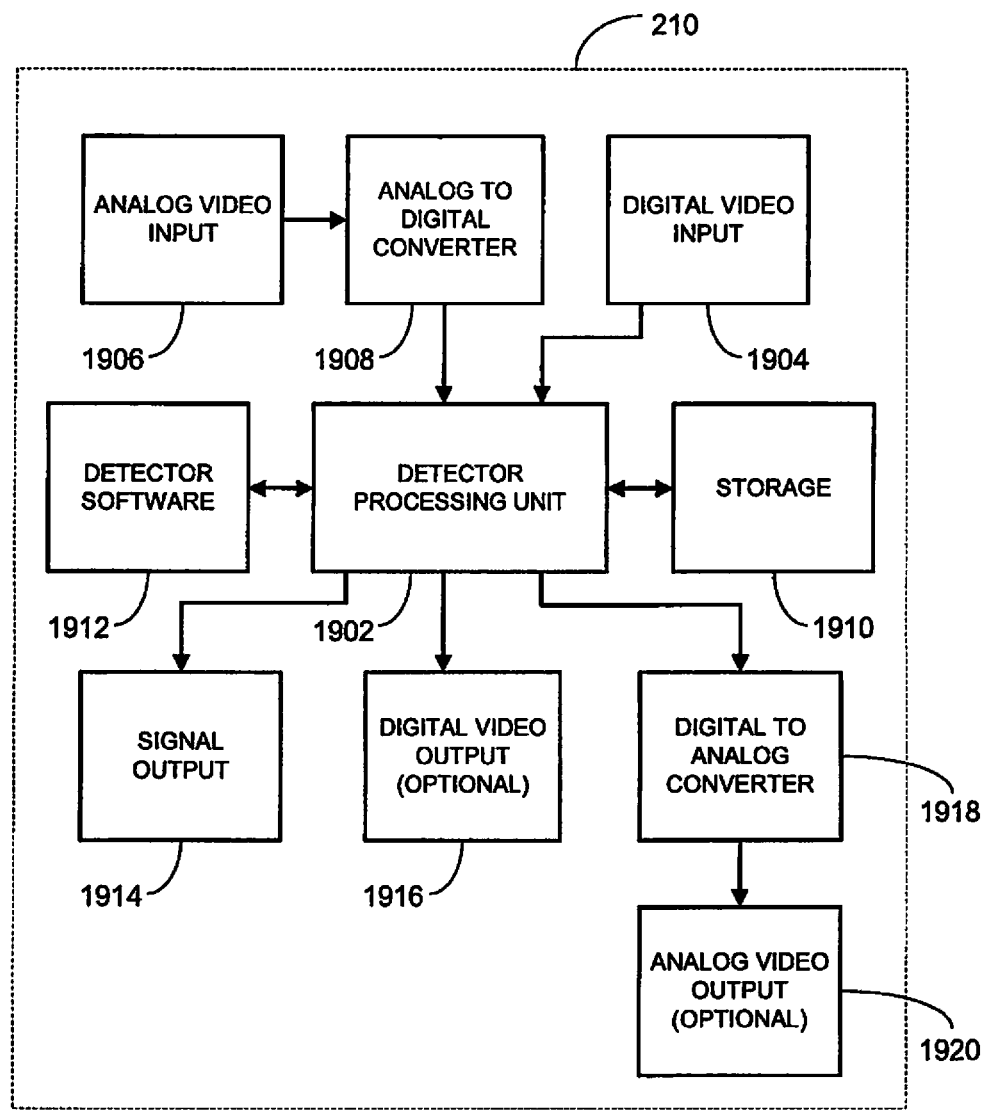
FIG. 19 is a block diagram of an example inline decoder that may be deployed in the decoding system of FIG. 2 according to an example embodiment.
Figure 20:
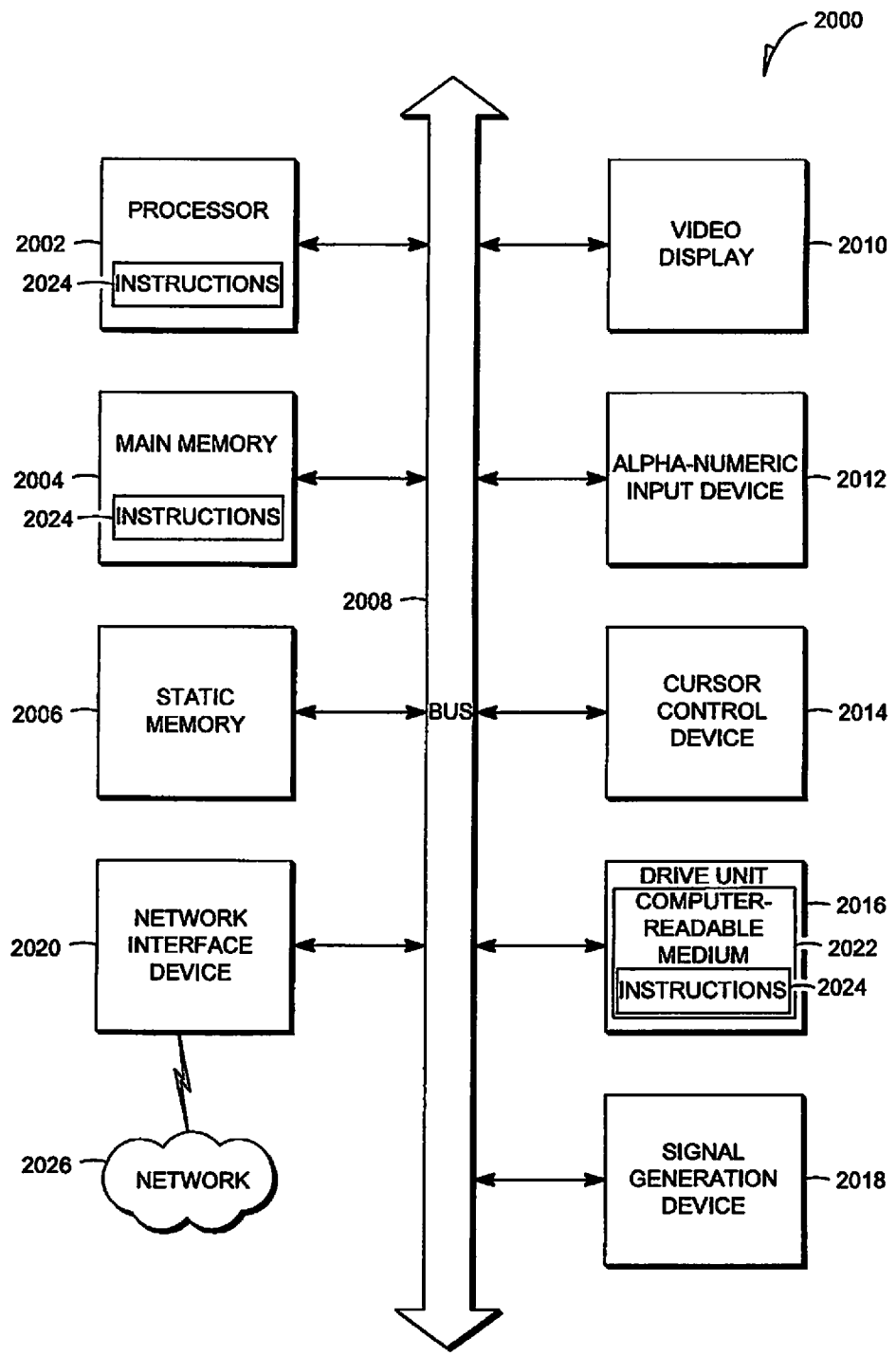
FIG. 20 illustrates a diagrammatic representation of a machine in the example form of a computer system within which a set of instructions for causing the machine to perform any one or more of the methodologies discussed herein may be executed.

FIG. 19 illustrates an example inline decoder 210 (see FIG. 2) that may be deployed in the decoding system 200 or another system.

The inline decoder 210 may include an analog video input 1906 to receive the encoded content signal 112 from the broadcast source 114 when the encoded content signal 112 is an analog format, and a digital video input 1904 for receiving the encoded content signal 112 when the encoded content signal 112 is in a digital format. For example, the digital video input 1904 may directly pass the encoded content signal 112 to a decoder processing unit 1902, while the analog video input 1906 may digitize the encoded content signal 112 by use of an analog-to-digital converter 1908 before passing the encoded content signal 112 to the decoder processing unit 1902. However, other configurations of inputs and/or outputs of encoded content signal 112 may also be used.

The decoder processing unit 1902 may process the encoded content signal 112 to detect the image registration pattern 110. The decoder processing unit 1902 may be an application specific circuit, programmable hardware, integrated circuit, application software unit, and/or hardware and/or software combination. The decoder processing unit 1902 may store the pixel values (e.g., luminance, chrominance, or luminance and chrominance) of the encoded content signal 112 in storage 1910 and may detect pixels that have increased or decreased pixel values. The decoder processing unit 1902 may process the encoded content signal 112 to detect the image registration pattern 110.

The image registration pattern 110 may be transferred from the inline decoder 210 to the signaled device 214 (see FIG. 2) by a signal output 1914. The inline decoder 210 may optionally output the encoded content signal 112 in a digital format through a digital video output 1916 and/or in an analog format by first converting the encoded content signal 112 from the digital format to the analog format by use of an digital-to-analog converter 1918, and then outputting the encoded content signal 112 through an analog video output 1920. However, the inline decoder 210 need not output the encoded content signal 112 unless otherwise desired.

FIG. 19 shows a diagrammatic representation of machine in the example form of a computer system 1900 within which a set of instructions may be executed causing the machine to perform any one or more of the methods, processes, operations, or methodologies discussed herein. The signal source 102, the encoder 106, the broadcast source 114, the display device 206.1, 206.2, the optical decoder 208, the inline decoder 210, and/or the signaled device 214 may include the functionality of the computer system 1900.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1900 includes a processor 1902 (e.g., a central processing unit (CPU) a graphics processing unit (GPU) or both), a main memory 1904 and a static memory 1906, which communicate with each other via a bus 1908. The computer system 1900 may further include a video display unit 1910 (e.g., a liquid crystal display (LCD) or a cathode ray tube (CRT)). The computer system 1900 also includes an alphanumeric input device 1912 (e.g., a keyboard), a cursor control device 1914 (e.g., a mouse), a drive unit 1916, a signal generation device 1918 (e.g., a speaker) and a network interface device 1920.

The drive unit 1916 includes a machine-readable medium 1922 on which is stored one or more sets of instructions (e.g., software 1924) embodying any one or more of the methodologies or functions described herein. The software 1924 may also reside, completely or at least partially, within the main memory 1904 and/or within the processor 1902 during execution thereof by the computer system 1900, the main memory 1904 and the processor 1902 also constituting machine-readable media.

The software 1924 may further be transmitted or received over a network 1926 via the network interface device 1920.

While the machine-readable medium 1922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies shown in the various embodiments of the present invention. The term "machine-readable medium" shall accordingly be taken to include, but not be limited to, solid-state memories, optical and magnetic media, and carrier wave signals.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules be implemented as hardware circuitry, optical components, single or multi-processor circuits, memory circuits, software program modules and objects, firmware, and combinations thereof, as appropriate for particular implementations of various embodiments.

Thus, methods and systems for image registration have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment

What is claimed is:

1. A method comprising:
accessing a region of an image, the region including a plurality of pixels;
selecting one or more wavelengths;
selecting one or more associated phases for the one or more wavelengths;
constructing a digital image registration pattern by applying a function to the one or more wavelengths and the one or more associated phases for the one or more wavelengths, the digital image registration pattern including a plurality of pattern values;
altering at least one pixel variable value of the plurality of pixels by at least one of the pattern values obtained from the digital image registration pattern;
accessing an encoding region of the image;
accessing a comparison region of a comparison image;
taking an average pixel variable value of one or more subregions of the encoding region and the comparison region to obtain a comparison region average and an encoding region average for the one or more subregions; and
adding a difference between the comparison region average for a pixel variable and the encoding region average to pixel values for a plurality of subregion pixels of a particular subregion of the one or more subregions to create a prepared region.

2. The method of claim 1, wherein the one or more wavelengths include a plurality of wavelengths and selecting the one or more wavelengths comprises selecting a plurality of wavelengths in a defined ratio.

3. The method of claim 1, wherein constructing the digital image registration pattern includes applying a linear combination of trigonometric cosine functions on the one or more wavelengths and the one or more associated phases of the one or more wavelengths to construct the digital image registration pattern.

4. The method of claim 1, wherein constructing the digital image registration pattern includes applying a linear combination of trigonometric sine functions on the one or more wavelengths and the one or more associated phases of the one or more wavelengths to construct the digital image registration pattern.

5. The method of claim 1, wherein the at least one pixel variable value is altered in at least one direction by the pattern value that is obtained from the digital image registration pattern.

6. A system comprising:
a region access module to access a region of an image, the region including a plurality of pixels;
a wave selection module to select one or more wavelengths;
a phase selection module to select one or more associated phases for the one or more wavelengths;
a function construction module to apply a function to the one or more wavelengths and the one or more associated phases of the one or more wavelengths to construct a digital image registration pattern, the digital image registration pattern including a plurality of pattern values;
a pixel variable value alteration module to alter at least one pixel variable value of the plurality of pixels by at least one of the pattern values obtained from the digital image registration pattern,
wherein the region access module is configured to access the encoding region of the image and to access a comparison region of a comparison image;
an average obtaining module to take an average pixel variable value of one or more subregions of the encoding region and the comparison region to obtain a comparison region average and an encoding region average for the one or more subregions; and
a difference adding module to add a difference between the comparison region average for a pixel variable and the encoding region average to pixel values for a plurality of subregion pixels of a particular subregion of the one or more subregions to create a prepared region;
wherein the region access module, the wave selection module, the phase selection module, the function construction module, the pixel variable value alteration module, the average obtaining module, and the difference adding module include hardware circuitry.

7. The system of claim 6, wherein the one or more wavelengths include a plurality of wavelengths and the wave selection module is configured to select a plurality of wavelengths in a defined ratio.

8. The system of claim 6, wherein the function construction module is configured to apply a linear combination of trigonometric cosine functions on the one or more wavelengths and the one or more associated phases of the one or more wavelengths to construct the digital image registration pattern.

9. The system of claim 6, wherein the function construction module is configured to apply a linear combination of trigonometric sine functions on the one or more wavelengths and the one or more associated phases of the one or more wavelengths to construct the digital image registration pattern.

10. The system of claim 6, wherein the pixel variable value alteration module is configured to alter the at least one pixel variable value of the plurality of pixels in at least one direction by the pattern value obtained from the digital image registration pattern.

11. A non-transitory computer readable medium comprising instructions, which when implemented by one or more processors, cause the one or more processors to:
access a region of an image, the region including a plurality of pixels;
select one or more wavelengths;
select one or more associated phases for the one or more wavelengths;
apply a function to the one or more wavelengths and the one or more associated phases of the one or more wavelengths to construct a digital image registration pattern, the digital image registration pattern including a plurality of pattern values;
alter at least one pixel variable value of the plurality of pixels by a pattern value obtained from the digital image registration pattern;
access an encoding region of the image;
access a comparison region of a comparison image;
take an average pixel variable value of one or more subregions of the encoding region and the comparison region to obtain a comparison region average and an encoding region average for the one or more subregions; and
add a difference between the comparison region average for a pixel variable and the encoding region average to the pixel values for a plurality of subregion pixels of a particular subregion of the one or more subregions to create a prepared region.

12. The computer readable medium of claim 11, wherein the one or more wavelengths include a plurality of wavelengths and the instructions cause the one or more processors to select the one or more wavelengths in a defined ratio.

13. The computer readable medium of claim 11, wherein the instructions cause the one or more processors to apply a linear combination of trigonometric cosine functions on the one or more wavelengths and the one or more associated phases of the one or more wavelengths to construct the digital image registration pattern.

14. The computer readable medium of claim 11, wherein the instructions cause the one or more processors to apply a linear combination of trigonometric sine functions on the one or more wavelengths and the one or more associated phases of the one or more wavelengths to construct the digital image registration pattern.

15. The computer readable medium of claim 11, wherein the instructions cause the one or more processors to alter the at least one pixel variable value by altering the at least one pixel variable value of the plurality of pixels in at least one direction by the pattern value obtained from the digital image registration pattern.

* * * * *